US011631263B1

(12) United States Patent
Fang et al.

(10) Patent No.: US 11,631,263 B1
(45) Date of Patent: Apr. 18, 2023

(54) GRADIENT BOOSTING TREE-BASED SPATIAL LINE GROUPING ON DIGITAL INK STROKES

(71) Applicant: Microsoft Technology Licensing, LLC, Redmond, WA (US)

(72) Inventors: Biyi Fang, Kirkland, WA (US); Sheng Yi, Bellevue, WA (US); Tianyi Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/522,608

(22) Filed: Nov. 9, 2021

(51) Int. Cl.
*G06V 30/32* (2022.01)
*G06V 10/44* (2022.01)
*G06V 30/40* (2022.01)

(52) U.S. Cl.
CPC .......... *G06V 30/347* (2022.01); *G06V 10/457* (2022.01); *G06V 30/36* (2022.01); *G06V 30/40* (2022.01)

(58) Field of Classification Search
CPC .... G06V 30/347; G06V 10/457; G06V 30/36; G06V 30/40
See application file for complete search history.

(56) References Cited

U.S. PATENT DOCUMENTS

| 7,945,097 | B2 | 5/2011 | Biswas et al. | |
| 2008/0260241 | A1* | 10/2008 | Ye | G06F 40/171 |
| | | | | 382/159 |
| 2008/0292190 | A1* | 11/2008 | Biswas | G06F 3/04883 |
| | | | | 382/187 |
| 2020/0302163 | A1 | 9/2020 | Shi et al. | |

OTHER PUBLICATIONS

"Gradient Boosting", Retrieved From: https://en.wikipedia.org/w/index.php?title=Gradient_boosting&oldid=1016946224, Apr. 9, 2021, 9 Pages.

(Continued)

*Primary Examiner* — King Y Poon
*Assistant Examiner* — Michael L Burleson
(74) *Attorney, Agent, or Firm* — NovoTechIP International PLLC

(57) ABSTRACT

Systems and methods for performing spatial line grouping on digital ink stokes. The system includes an electronic processor configured to access a set of hypothetical lines in an electronic document and determine a set of hypothetical line pairings. The electronic processor is also configured to determine, via a gradient boosting tree model, a merge confidence score for each hypothetical line pairing and compare a first merge confidence score with a merge threshold. The first merge confidence score is associated with a first hypothetical line and a first neighboring hypothetical line. The electronic processor is also configured to, in response to the first merge confidence score satisfying the merge threshold, merge the first hypothetical line and the first neighboring hypothetical line to form a first line grouping. The electronic processor is also configured to perform a digital ink stroke analysis on the electronic document based on the first line grouping.

20 Claims, 18 Drawing Sheets

(56) References Cited

OTHER PUBLICATIONS

Dengel, et al., "Ch 6: Analysis of the Logical Layout of Documents; Ch 7: Page Similarity and Classification; Ch 10 Machine-Printed Character Recognition", In Handbook of Document Image Processing and Recognition, Feb. 2, 2014, 105 Pages.
"International Search Report and Written Opinion Issued in PCT Application No. PCT/US22/042822", dated Dec. 5, 2022, 13 Pages.
Shilman, et al., "Discerning Structure from Freeform Handwritten Notes", In Proceedings of Seventh International Conference on Document Analysis and Recognition, Aug. 6, 2003, 6 Pages.

* cited by examiner

GRADIENT BOOSTING TREE-BASED SPATIAL LINE GROUPING ON DIGITAL INK STROKES

FIELD

Embodiments described herein provide systems and methods for digital inking and, in particular, systems and methods for grouping digital ink strokes using spatial relationships between digital ink strokes and a gradient boosted tree model.

SUMMARY

Digital inking allows handwriting and drawings to be added electronically to electronic documents. For example, users may use a pen to perform digital inking within a canvas provided within an electronic document for journaling (for example, note-taking, generating lists, adding captions or annotations to photos, or the like), planning (for example, calendaring, goal or habit tracking, to-dos, or the like), and content-creating (for example, diagramming, mind mapping, storytelling, and the like). This pen may be referred to as a digital pen as it can be used to create digital ink within a canvas. The digital pen can include a passive pen (for example, a stylus) or an active pen.

Inking applications, which provide a user with a canvas for performing digital inking, also provide tools for digital ink stroke analysis. A digital ink stroke analysis tool may include, for example, a layout analysis tool that performs writing region grouping functionality, bullet analysis functionality, outline analysis functionality, or the like. As another example, a digital ink stroke analysis tool may include a handwriting recognition tool, such that a user of the digital inking application may convert digital ink (digital ink strokes) to text, perform searching within an electronic document or canvas, and the like. The accuracy of the digital ink stroke analysis tools impacts a user's ability to leverage the functionality provided by the digital ink analysis tools.

As part of implementing digital ink analysis tools, digital ink strokes are grouped into one or more line groupings. Knowing which digital ink strokes are part of a line (or line grouping) improves the application of digital ink analysis tools. As one example, with respect to performing a bullet analysis function on digital ink strokes, knowing which digital ink strokes belong to a line (or ling grouping) impacts the decision or determination as to which digital ink stokes are included in a bullet point as opposed to another different bullet point. Accordingly, the accuracy associated with grouping digital ink stokes into lines (or line groupings) impacts the accuracy and functionality associated with digital ink stroke analysis tools. Improving such grouping improves computing resource usage (e.g., fewer errors or changes need to be performed manually) and improves the speed and efficiency in creating and managing digital content. Accordingly, embodiments provided herein provide methods and systems of performing spatial line grouping on digital ink stokes that provides an improved line grouping accuracy and word recognition rate.

For example, one embodiment provides a system for performing spatial line grouping on digital ink stokes. The system includes a memory configured to store instructions and an electronic processor coupled to the memory. The electronic processor, through execution of the instructions stored in the memory, is configured to access a set of hypothetical lines in an electronic document, wherein each hypothetical line includes a set of digital ink strokes. The electronic processor is also configured to determine, based on the set of hypothetical lines, a set of hypothetical line pairings, wherein each hypothetical line pairing includes a hypothetical line and a neighboring hypothetical line included in the set of hypothetical lines. The electronic processor is also configured to determine, via a gradient boosting tree model, a merge confidence score for each hypothetical line pairing included in the set of hypothetical line pairings to create a set of merge confidence scores. The electronic processor is also configured to compare a first merge confidence score included in the set of merge confidence scores with a merge threshold, wherein the first merge confidence score is a highest merge confidence score included in the set of merge confidence scores and is associated with a first hypothetical line pairing including a first hypothetical line and a first neighboring hypothetical line. The electronic processor is also configured to, in response to the first merge confidence score satisfying the merge threshold, merge the first hypothetical line and the first neighboring hypothetical line to form a first line grouping in the electronic document. The electronic processor is also configured to perform a digital ink stroke analysis on the electronic document based on the first line grouping.

Another embodiment provides a method for determining spatial line grouping on digital ink stokes. The method includes accessing a set of hypothetical lines in an electronic document including digital ink strokes, wherein each hypothetical line includes a set of digital ink strokes. The method also includes determining, with an electronic processor, a set of hypothetical line pairings, wherein each hypothetical line pairing includes a hypothetical line and a neighboring hypothetical line. The method also includes determining, with the electronic processor, via a gradient boosting tree model, a merge confidence score for each hypothetical line pairing included in the set of hypothetical line pairings as a set of merge confidence scores. The method also includes comparing, with the electronic processor, a first merge confidence score included in the set of merge confidence scores with a merge threshold, wherein the first merge confidence score is a highest merge confidence score included in the set of merge confidence scores and is associated with a first hypothetical line pairing including a first hypothetical line and a first neighboring hypothetical line. The method also includes, in response to the first merge confidence score satisfying the merge threshold, merging, with the electronic processor, the first hypothetical line and the first neighboring hypothetical line to form a first line grouping in the electronic document. The method also includes performing a digital ink stroke analysis on the electronic document based on the first line grouping.

A further embodiment provides non-transitory computer readable medium storing instructions that, when executed by an electronic processor, perform a set of functions. The set of functions includes accessing a set of hypothetical lines in an electronic document including digital ink strokes, wherein each hypothetical line includes a set of digital ink strokes. The set of functions also includes determining a set of hypothetical line pairings, wherein each hypothetical line pairing includes a hypothetical line and a neighboring hypothetical line. The set of functions also includes determining, via a gradient boosting tree model, a merge confidence score for each hypothetical line pairing included in the set of hypothetical line pairings as a set of merge confidence scores. The set of functions also includes comparing a first merge confidence score included in the set of merge confidence scores with a merge threshold, wherein the first merge confidence score is a highest merge confidence score included in the set of merge confidence scores and is associated with a first hypothetical line pairing including a first hypothetical line and a first neighboring hypothetical line. The set of functions also includes, in response to the first merge confidence score satisfying the merge threshold, merging the first hypothetical line and the first neighboring hypothetical line to form a first line grouping in the electronic document. The set of functions also includes performing a digital ink stroke analysis on the electronic document based on the first line grouping and the second line grouping.

Other aspects of the embodiments will become apparent by consideration of the detailed description and accompanying drawings.

DETAILED DESCRIPTION

Figure 1:
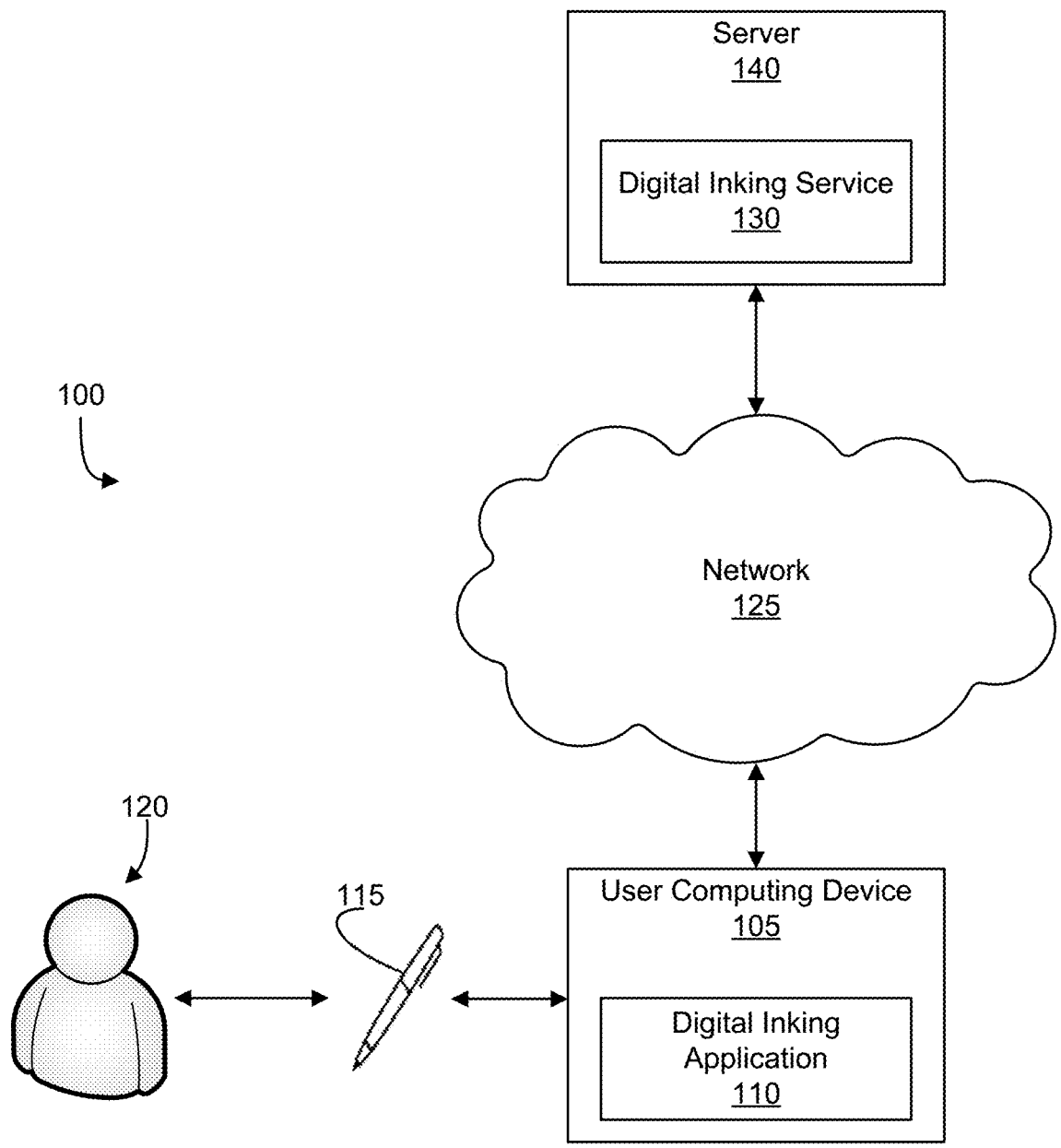
FIG. 1 is a block diagram of a digital inking system according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, embodiments described herein provide methods and systems for performing spatial line grouping on digital ink stokes, and, in particular, determining spatial line grouping using a gradient boosted tree model, which improves line grouping accuracy and word recognition rate. Accordingly, embodiments described herein provide a technical solution that results in improved spatial line grouping of digital ink strokes (which ultimately improves digital ink stroke analysis tools and functionality, such as, for example, word recognition rates) within an inking application that also results in an improved user experience and efficiency of digital inking applications. The technical effects, therefore, show an improvement in the functioning of computers, particularly those providing inking applications with a canvas for receiving digital ink and analyzing the digital ink.

FIG. 1 is a block diagram of a digital inking system 100 according to some embodiments. As illustrated, the system 100 includes a user computing device 105 and a digital pen 115. Non-limiting examples of the user computing device 105 include a laptop computer, a desktop computer, a tablet computer, a mobile telephone, a personal digital assistant (PDA), a mobile email device, or another electronic device configured to perform digital inking or digital ink analysis. As illustrated in FIG. 1, the user computing device 105 receives input from the digital pen 115 as operated or controlled by a user 120 (for example, an author of digital ink strokes). The digital pen 115 may include a passive pen (for example, a stylus) or an active pen.

The user computing device 105 includes a digital inking application 110. The digital inking application 110 provides, within an electronic document, such as, for example, a digital journal, a canvas, or the like configured to receive digital ink via the digital pen 115. In some embodiments, the digital inking application 110 is a stand-alone application executed by the user computing device 105 (an electronic processor included in the user computing device 105) to provide the digital inking and digital ink analysis functionality described herein. In other embodiments, however, the digital inking application 110 may access or otherwise communicate with a digital inking service 130 provided by a server 140, which may provide one or more hosted services. In this embodiment, the user computing device 105 is connected to a network 125 to communicate with the server 140.

The network 125 may include one or more wired networks, wireless networks, or a combination thereof that enable communications between the various entities in the system 100. In some configurations, the communication network 125 includes cable networks, the Internet, local area networks (LANs), wide area networks (WAN), mobile telephone networks (MTNs), and other types of networks, possibly used in conjunction with one another, to facilitate communication between the user computing device 105 and the server 140.

In embodiments where the digital inking application 110 communicates with the digital inking service 130, the digital inking application 110 installed on the user computing device 105 may be a general purpose browser application configured to access various services and content over the network 125, including the digital inking service 130 provided by the server 140. Alternatively, in this type of service-based embodiment, the digital inking application 110 installed on the user computing device 105 may be a dedicated application configured to access the digital inking service 130. Also, it should be understood that the functionality described herein as being performed by the digital inking application 110 may be performed by the user computing device 105, the server 140, or a combination thereof where functionality may be distributed in various manners.

It should also be understood that the system 100 illustrated in FIG. 1 is provided by way of example and the system 100 may include additional, different, or fewer components and may combine components and divide one or more components into additional components. For example, the system 100 may include any number of user computing devices 105 or networks 125 and various intermediary devices may exist between a user computing device 105 and the server 140. Also, in some embodiments, multiple servers 140 may be used to provide the digital inking service 130, such as within a cloud computing environment.

Figure 2:
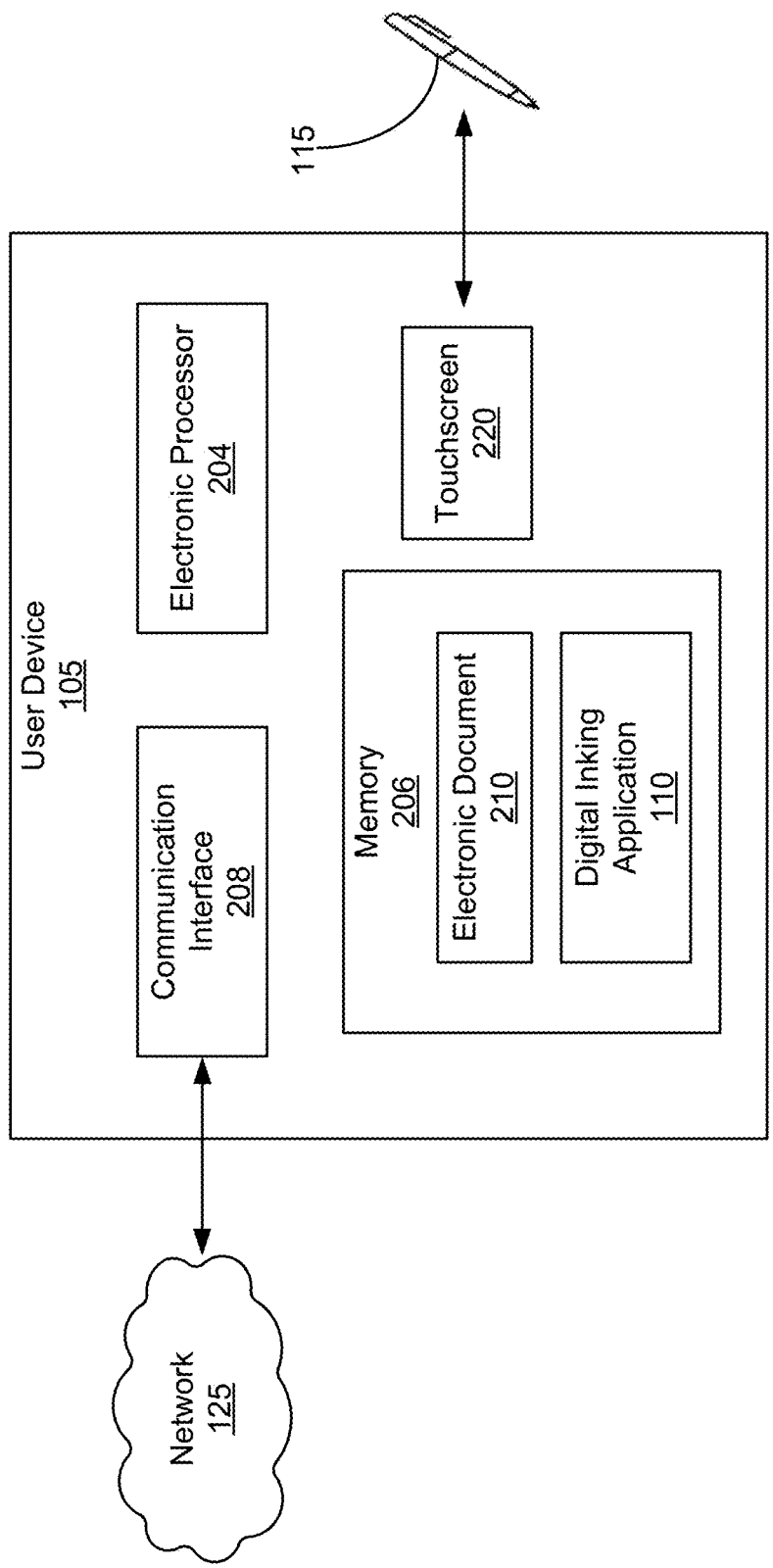
FIG. 2 is a block diagram of a user device and a digital pen included in the digital inking system of FIG. 1 according to some embodiments.

As illustrated in FIG. 2, the user computing device 105 includes an electronic processor 204, a computer-readable memory 206, and a communication interface 208. The electronic processor 204, the memory 206, and the communication interface 208 communicate wirelessly, over one or more wired communication channels or busses, or a combination thereof (not illustrated). The memory 206 includes non-transitory memory, such as random access memory, read-only memory, or a combination thereof. The electronic processor 204 may include a microprocessor, a microcontroller, a digital signal processor, or any combination thereof configured to execute instructions stored in the memory 206. The memory 206 may also store data used with and generated by execution of the instructions. The communication interface 208 allows the user computing device 105 to communicate with external networks and devices, including, for example, the network 125. For example, the communication interface 208 may include a wireless transceiver for communicating with the network 125. It should be understood that the user computing device 105 may include additional, different, or fewer components than those illustrated in FIG. 2 and may include components in various configurations. For example, in some embodiments, the user computing device 105 includes a plurality of electronic processors, a plurality of memories, a plurality of communication interfaces, or a combination thereof. Also, in some embodiments, the user computing device 105 includes additional input devices, output devices, or a combination thereof.

As illustrated in FIG. 2, the memory 206 stores the digital inking application 110. The digital inking application 110 (as executed by the electronic processor 204) provides a canvas (for example, a digital journal) for receiving, displaying, and editing digital ink. In some embodiments, the digital inking application 110 also performs one or more digital ink analysis tools or functions, such as, for example, a layout analysis function, a handwriting analysis function, and the like. In some embodiments, the memory 206 also stores one or more electronic documents 210, such as one or more digital journals generated via the digital inking application 110. In some embodiments, the electronic documents 210 may be stored in separate memory included in the user computing device 105, in a memory external to the user computing device 105 but accessible by the user computing device 105 (for example, via the communication interface 208 or a dedicated port or interface), or in a combination thereof.

It should be understood that when the digital inking application 110 described herein is used in a networked environment with the server 140, the server 140 may include similar components as the user computing device 105 and, in particular, may include one or more electronic processors for executing applications or instructions that, when executed, provide the digital inking service 130.

As illustrated in FIG. 2, the user computing device 105 also includes (or communicates with) a touchscreen 220. The digital inking application 110 (or a separate application or module) is configured to detect when the digital pen 115 touches or otherwise interacts with the touchscreen 220 (for example, using capacitive technology). These detected positions may be translated to ink points and digital strokes via the digital inking application 110, which may be used to generate and add digital ink to the canvas. As noted above, in some embodiments, the digital pen 115 includes a passive pen. However, in other embodiments, the digital pen 115 includes an active pen. An active pen, as compared to a passive pen, includes electronics or circuitry configured to communicate with a digitizer included in the touchscreen 220. This communication allows the digital inking application 110 to provide additional functionality as compared to when the digital pen 115 includes a passive pen. For example, when the digital pen 115 is an active pen, the digital inking application 110 may provide functionality that uses or is responsive to pressure or touch sensitivity applied by the digital pen 115, a tilt of the digital pen 115, a position of the digital pen 115 (such as a position of the digital pen 115 even when the digital pen 115 is hovering over but not touching the touchscreen 220), activation of input mechanisms (for example, buttons) on the digital pen 115, use of an eraser tip of the digital pen 115, or the like.

As described above, the digital inking application 110 (as executed by the one or more electronic processors 204) provides a canvas within an electronic document (for example, as part of a digital journal) and is configured to detect digital strokes input via the digital pen 115 and process the digital strokes to generate, add, and edit digital ink within the canvas. Additionally, in some embodiments, the digital inking application 110 provides or performs one or more digital ink analysis functions, such as, for example, a layout analysis function, a handwriting recognition analysis function, and the like. The digital inking application 110 may also perform additional functionality not described herein, such as, for example, general digital content creation functionality and management.

Figure 3:
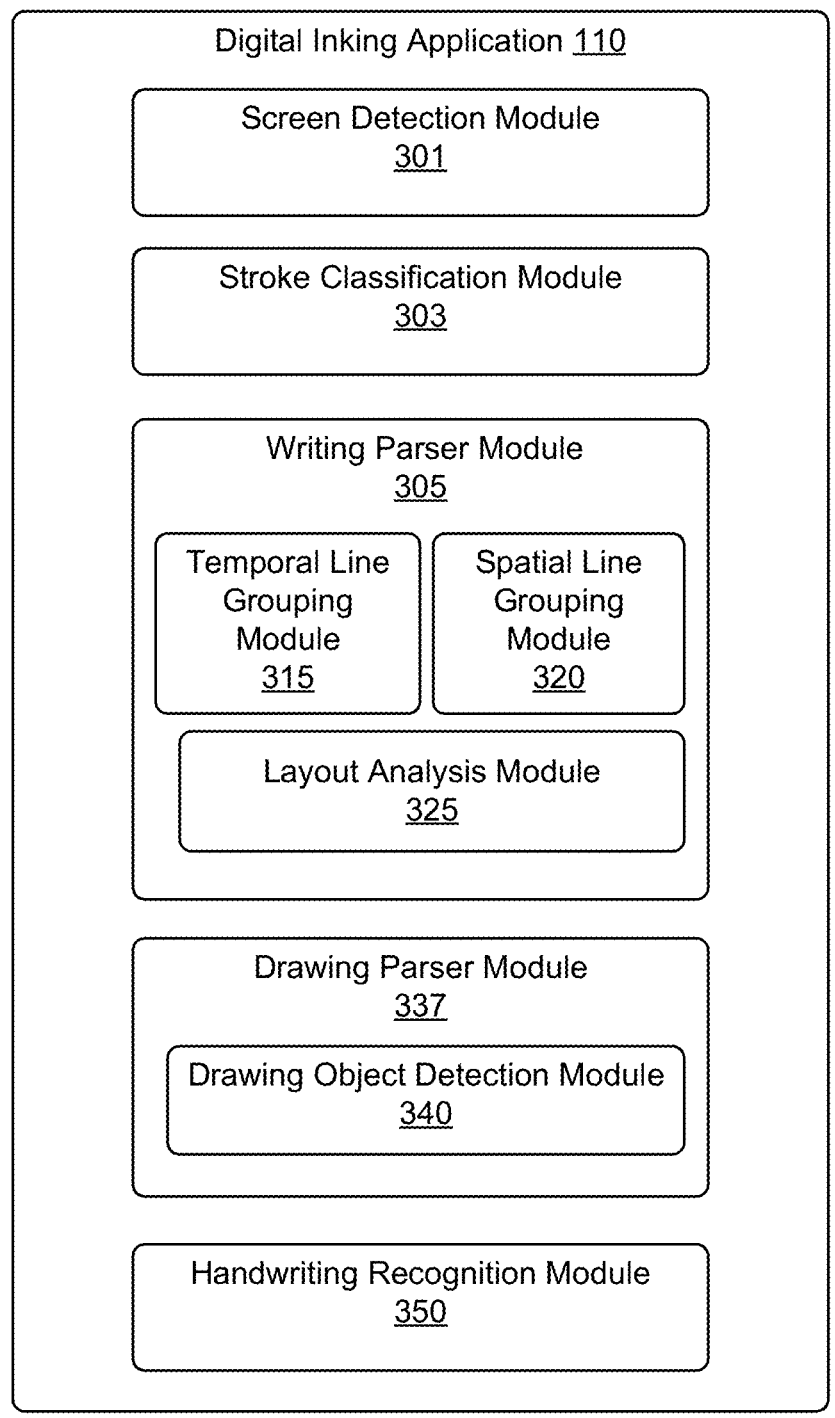
FIG. 3 is a block diagram of components included in a digital inking application provided via the digital inking system of FIG. 1 according to some embodiments.

FIG. 3 is a block diagram of example components of the digital inking application 110 according to some embodiments. As illustrated, the digital inking application 110 may include a screen detection module 301, a stroke classification module 303, a writing parser module 305 (including a temporal line grouping module 315, a spatial line grouping module 320, a layout analysis module 325), a drawing parser module 337 (including a drawing object detection module 340), and a handwriting recognition module 350. The modules described herein with respect to FIG. 3 represent instructions stored in one or more memories (for example, the memory 206) executable by the electronic processor 204 to perform the functionality described herein. It should be understood that the functionality described herein may be performed by various configurations of modules, engines, or applications and the particular configuration illustrated in FIG. 3 and described herein is provided merely as one example. For example, in some embodiments, functionality described as being performed by multiple modules may be performed by a single module or functionality described as being performed by one module may be distributed between two or more modules. Similarly, it should be understood that when digital inking is provided within a networked environment with the server 140, the digital inking service 130 may include similar components as the application 110 and, in some embodiments, functionality associated with the modules described here can be distributed between the application 110 and the digital inking service 130 in various configurations.

The screen detection module 301 detects activities implemented on the touchscreen 220, which displays an electronic document including a canvas for receiving digital ink (as generated by the digital inking application 110). The canvas defines an area of a user interface for receiving and displaying digital ink, and the activities detected by the screen detection module 301 include interactions between the touchscreen 220 and the digital pen 115. In some embodiments, the screen detection module 301 also detects other types of activities or input associated with the digital pen 115, such as a position of the digital pen 115 regardless of whether the digital pen 115 is touching or otherwise interacting with the touchscreen 220. Also, in some embodiments, the screen detection module 310 detects activities implemented on the touchscreen 220 via a user's finger, via a cursor-controlled device, or via other input devices or mechanisms.

Figure 4:
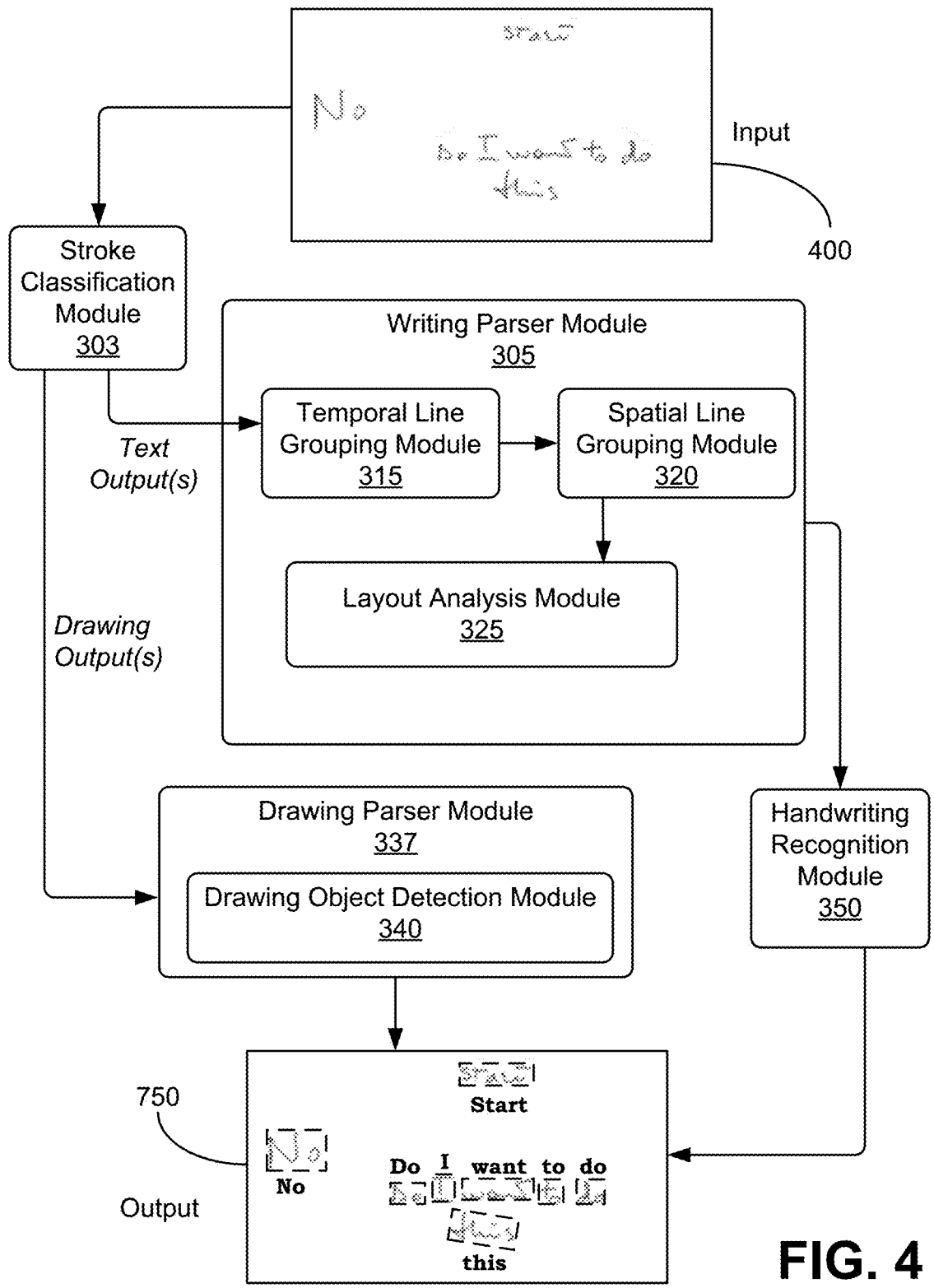
FIG. 4 illustrates an example communication flow or workflow of the components of the digital inking application of FIG. 3 according to some embodiments.

FIG. 4. illustrates an example communication flow or workflow of the components of the digital inking application 110 according to some embodiments. As illustrated in FIG. 4, an input 400 of digital ink strokes is detected by the screen detection module 301. The screen detection module 301 may detect the input 400 as one or more interactions between the touchscreen 220 and an input device or mechanism (for example, the digital pen 115, a user's finger, a cursor-controlled device, another input device or mechanism, or a combination thereof).

As illustrated in FIG. 4, the input 400 is provided to the stroke classification module 303. The stroke classification module 303 classifies digital ink strokes (for example, the digital ink strokes included in the input 400). Digital ink strokes may be classified as, for example, text objects or drawing objects. It should be understood, however, that in some embodiments, the stroke classification module 303 is configured to classify digital ink strokes into other categories or types.

As used herein, a "text object" generally refers to digital ink strokes that represent text in the form of digital ink (for example, as digital ink text). A text object may include digital ink strokes representing, for example, one or more words, phrases, numbers, marks, symbols, characters or letters (for example, an alphabetical character or a numerical character), or the like. In contrast, a drawing object refers to digital ink strokes that represent a drawing (for example, a shape, an arrow, a doodle, a sketch of an object or shape, or the like).

Figure 5:
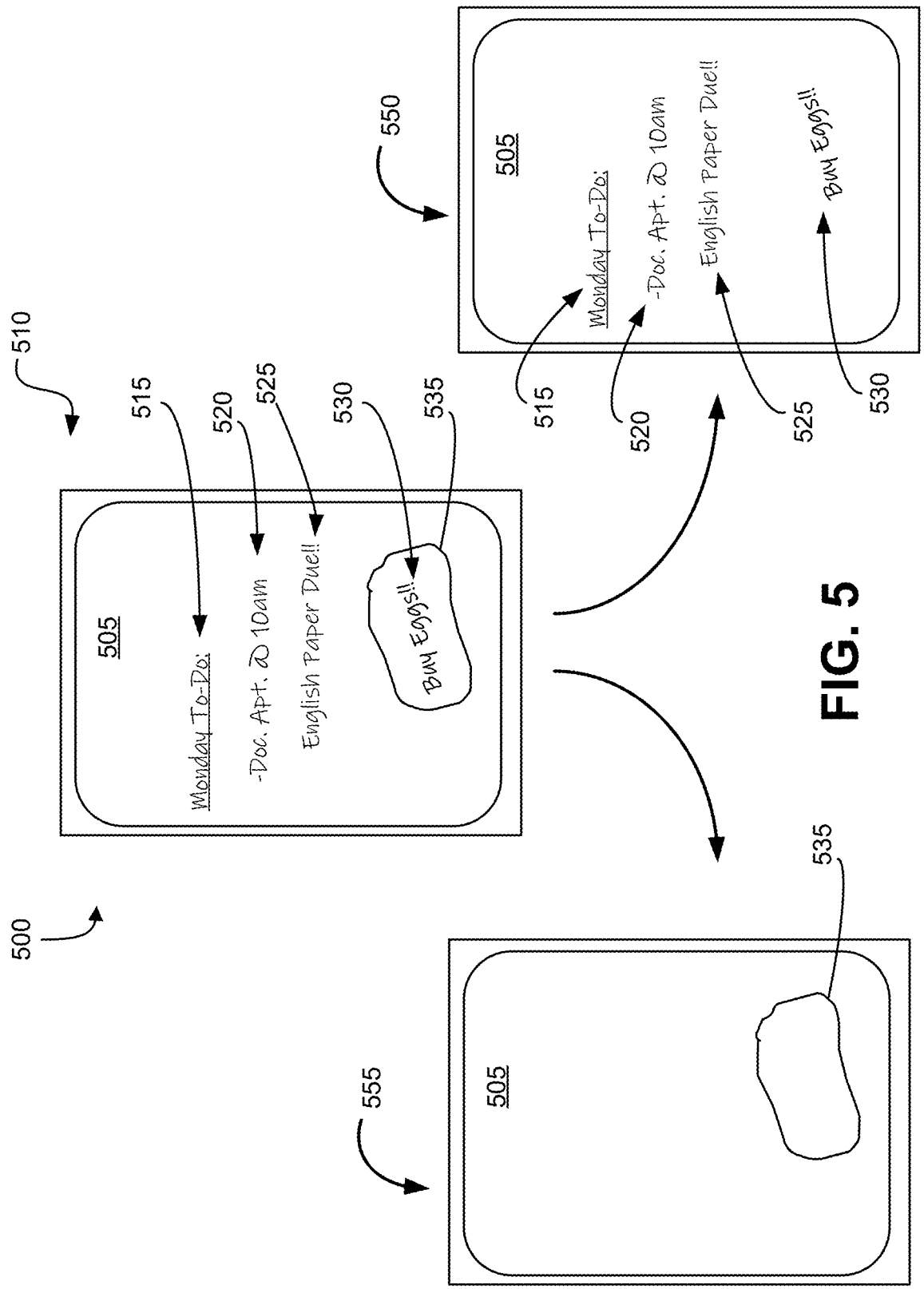
FIG. 5 illustrates an example user interface provided via the digital inking application according to some embodiments.

As one example, FIG. 5 illustrates a user interface 500 provided via the digital inking application 110. The user interface 500 includes a page 505 of an electronic document (for example, a digital journal) within a canvas 510. The page 505 includes a plurality of digital ink strokes. As illustrated in FIG. 5, the digital ink strokes included in the page 505 represent text objects (for example, the digital ink strokes associated with reference numerals 515, 520, 525, and 530) and a drawing object (for example, the digital ink strokes associated with reference numeral 535). The stroke classification module 303 is configured to receive or access the page 505 as input and analyze the page 505 to classify one or more of the digital ink strokes as a text object or a drawing object. After analyzing the page 505, the stroke classification module 303 may identify a set of text objects 550, a set of drawing objects 555, or a combination thereof. The set of text objects 550 may include the digital ink strokes that were classified as text objects. The set of drawing objects 555 may include the digital ink strokes that were classified as drawing objects. For example, as illustrated in FIG. 5 with to the specific example digital ink included in the page 505, the set of text objects 550 includes the digital ink strokes associated with reference numerals 515, 520, 525, and 530 (as text objects) and the set of drawing objects 555 includes the digital ink strokes associated with reference numeral 535 (as a drawing object).

Returning to FIG. 4, the stroke classification module 303 provides the text object(s), the drawing object(s), or a combination thereof from the stroke classification module 303 (for example, the set of text objects 550, the set of drawing objects 555, or a combination thereof) to the writing parser module 305, the drawing parser module 337, or a combination thereof. For example, as illustrated in FIG. 4, the stroke classification module 303 may provide a text object (for example, the text objects 515, 520, 525, and 530 of FIG. 5) to the writing parser module 305 and a drawing object (for example, the drawing object 535 of FIG. 5) to the drawing parser module 307.

The writing parser module 305 parses (or analyses) digital ink strokes classified as text objects. As noted above, the writing parser module 305 may include the temporal line grouping module 315, the spatial line grouping module 320, and the layout analysis module 325. It should be understood that the functionality described herein as being performed by the writing parser module 305 may be performed by various configurations of modules, engines, or applications and the particular configuration illustrated in FIGS. 3 and 4 and described herein is provided merely as one example. For example, in some embodiments, functionality described as being performed by multiple modules may be performed by a single module or functionality described as being performed by one module may be distributed between two or more modules. Alternatively or in addition, in some embodiments, the writing parser module 305 includes additional, different, or fewer components or modules than illustrated in FIGS. 3 and 4 and described herein.

The temporal line grouping module 315 groups digital ink strokes into one or more hypothetical lines (or writing sessions) (sometimes referred to as "hypolines" as a shortened version). As used herein, a "hypothetical line" refers to a grouping of digital ink or writing strokes that hypothetically (or may) form a text line. A "text line," as used herein refers to digital ink strokes (i.e., text objects) aligned in a predetermined format, such as in a direction of reading (e.g., a generally horizontal row of digital ink strokes).

In some embodiments, the temporal line grouping module 315 uses writing sequence information to generate or predict one or more hypothetical lines (for example, group digital ink strokes into one or more hypothetical lines). For example, when digital ink is generated within a canvas, data is recorded that not only captures where within the canvas the digital ink was added (e.g., spatial positional information for the ink points making up the digital ink) but temporal or sequence data is also recorded. As compared to recorded spatial information that represents where digital ink was added (i.e., where individual ink points were added), recorded temporal information represents the sequence (or temporal order) in which digital ink was added or, more specifically, the sequence of individual ink points.

Figure 6:
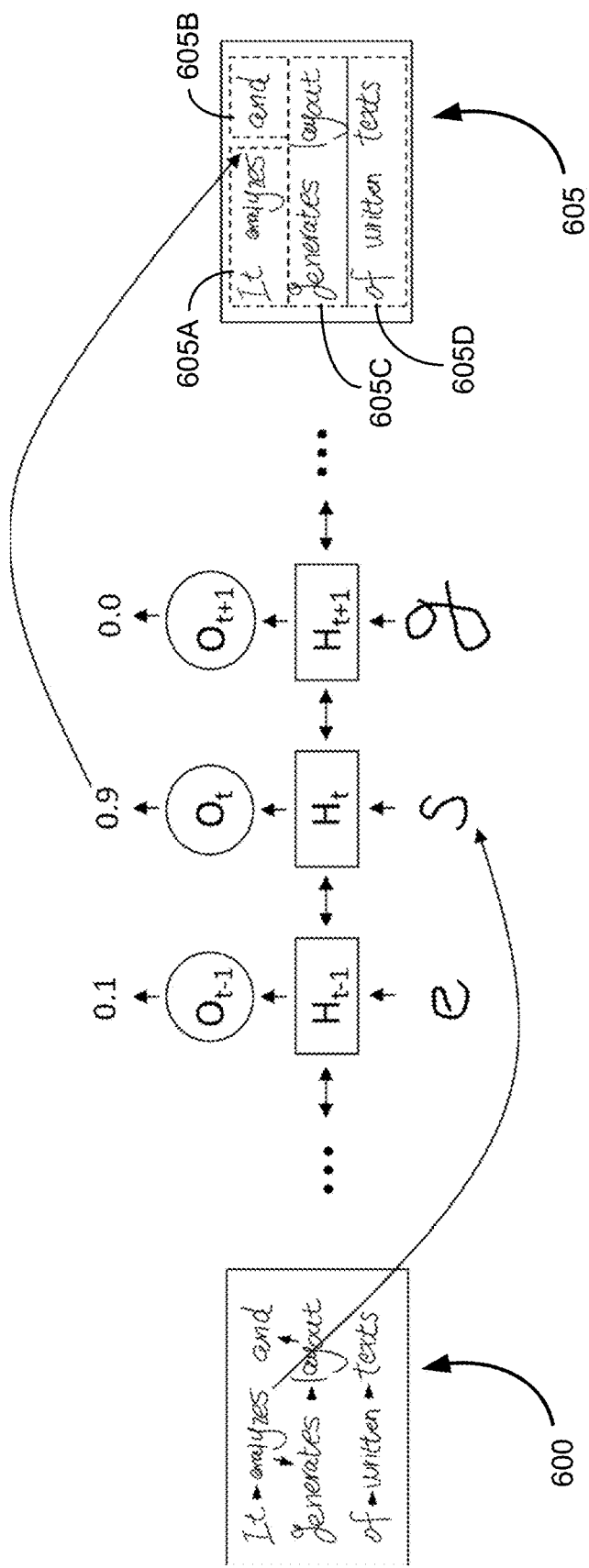
FIG. 6 illustrates temporal line grouping according to some embodiments.

FIG. 6 illustrates one example of temporal line grouping according to some embodiments. As illustrated in FIG. 6, the temporal line grouping module 315 may receive digital ink strokes 600 as input. As represented by the arrows in FIG. 6, the digital ink strokes 600 are associated with a specific temporal order or writing sequence (for example, writing sequence information recorded as part of the detected interactions between the touchscreen 220 and the pen 115). In the illustrated example, the digital ink strokes 600 includes the following words input in the following order or sequence: "It"—"analyzes"—"generates"—"layout"—"and"—"of"—"written"—"text." Based on the writing sequence information associated with the digital ink strokes 600, the temporal line grouping module 315 may group the digital ink strokes 600 into one or more hypothetical lines (for example, predict one or more hypothetical lines). In some embodiments, the temporal line grouping module 315 implements or uses a bidirectional recurrent neural network (BRNN) to predict hypothetical lines. For example, the temporal line grouping module 315 may determine a probability of one or more letters (digital ink strokes) being an end of a hypothetical line, such as, for example, based on a sequence, in temporal order, in which the digital ink strokes were received or input via the touchscreen 220, a spatial feature of each digital ink stroke, or a combination thereof. Accordingly, the temporal line grouping module 315 may analyze spatial features of each digital ink stroke according to a temporal order in which the digital ink strokes were received (for example, starting with the digital ink stroke received first) to determine a probability of a digital ink stroke is the end of a writing session or hypothetical line. These probabilities can be compared to a predetermined threshold to identify strokes (e.g., letters) that represent an end of a line. In the illustrated example, the probability that the letter "e" is the end of a hypothetical line is 0.1, the probability that the letter "s" is the end of a hypothetical line is 0.9, and the probability that the letter "g" is the end of a hypothetical line is 0.0. In this example, the letter "s" is selected as an end of one hypothetical line as its probability satisfies a predetermined threshold. Accordingly, as illustrated in FIG. 6, the temporal line grouping module 315 predicts four hypothetical lines 605 for the digital ink strokes 600: a first hypothetical line 605A, a second hypothetical line 605B, a third hypothetical line 605C, and a fourth hypothetical line 605D. As illustrated in FIG. 4, the temporal line grouping module 315 provides the hypothetical lines (for example, the hypothetical lines 605) to the spatial line grouping module 320 as input.

Figure 7:
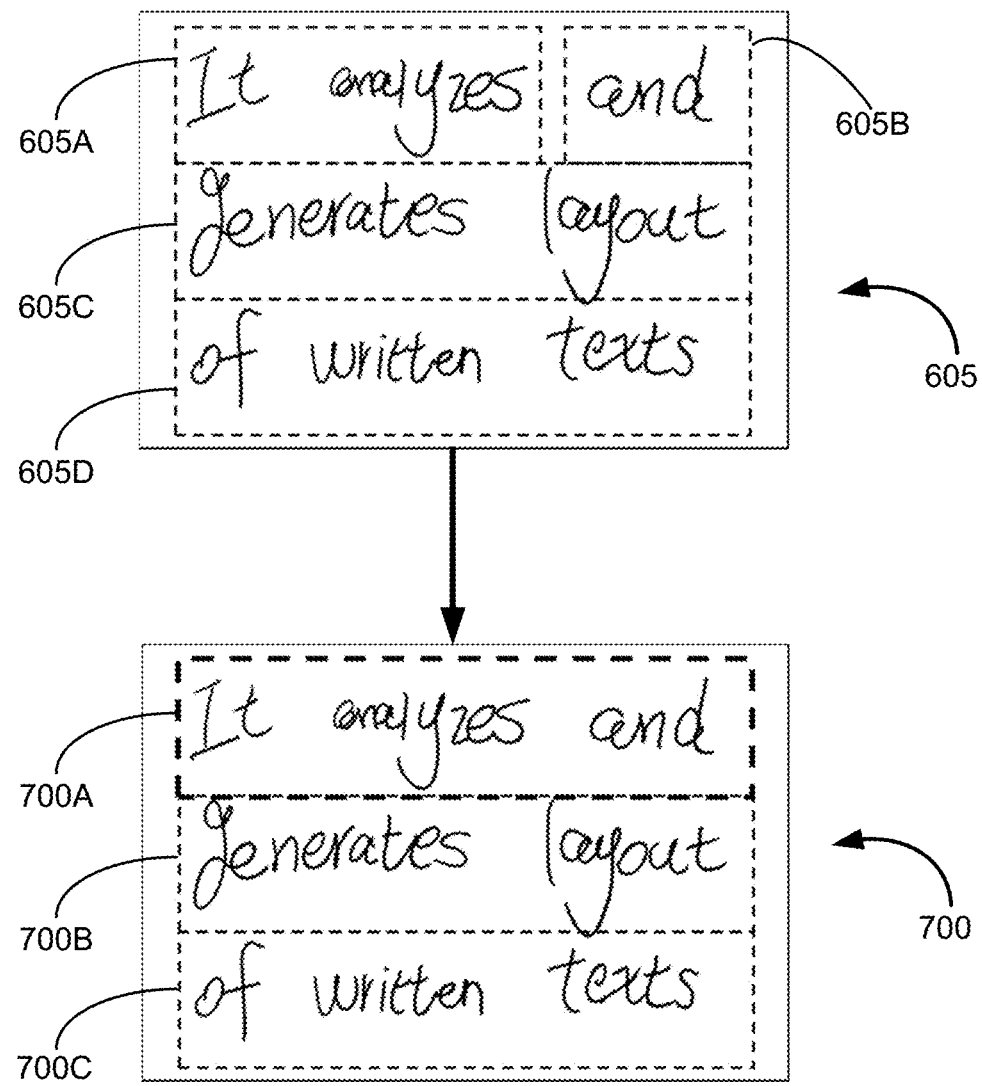
FIG. 7 illustrates an example input and output of a spatial line grouping module according to some embodiments.

The spatial line grouping module 320 uses spatial relations of the hypothetical lines generated by the temporal line grouping module to further group (or merge) the hypothetical lines into one or more line groupings. For example, as illustrated in FIG. 7, the spatial line grouping module 320 may receive the hypothetical lines 605 of FIG. 6 from the temporal line grouping module 315 (for example, as input) and further group the hypothetical lines 605 into one or more line groupings 700 (a first line grouping 700A, a second line grouping 700B, and a third line grouping 700C). In the illustrated example, the spatial line grouping module 320 further grouped (or merged) the first hypothetical line 605A and the second hypothetical line 605B into the first line grouping 700A. Additional details regarding the spatial line grouping performed by the spatial line grouping module 320 are provided below (see FIG. 8).

As illustrated in FIG. 4, the spatial line grouping module 320 generates or provides the generated one or more line groupings (as a set of line groupings) to the layout analysis module 335. The layout analysis module 335 may perform one or more layout analysis functions on the electronic document (including the set of line groupings). For example, the layout analysis module 335 may perform a writing region grouping analysis, a bullet detection analysis, an outline analysis, another type of layout analysis, or a combination thereof. The writing region grouping analysis may group or assign one or more line groupings to a writing region. As one example, the writing region grouping analysis may assign one or more line groupings to a paragraph based on a position or location of the one or more line groupings within the electronic document. The bullet detection analysis may identify whether a line grouping is associated with a bullet point (for example, whether a line grouping is included in a list, such as a bullet point list). The outline analysis may generate or determine an outline of the electronic document associated with the one or more line groupings.

In some embodiments, the digital ink application 110 also includes the handwriting recognition module 350 (as illustrated in FIGS. 3 and 4). The handwriting recognition module 350 performs handwriting recognition (or word recognition) on digital ink, such as, for example, the output of the writing parser module 305 (for example, a set of line groupings). For example, the handwriting recognition module 350 may process the digital ink strokes included in a line grouping received from the writing parser module 305 and recognize the digital ink strokes as text (for example, associate the digital ink strokes (or a portion thereof) as forming a letter, a word, or the like).

For example, as illustrated in FIG. 4, the handwriting recognition module 350 may process the digital ink strokes detected by the screen detection module 301 (as the input 400) and recognize the digital ink strokes included in the input 400 as recognized text. In some embodiments, the handwriting recognition module 350 may provide the recognized text as an output 750 (as illustrated in FIG. 4). In the illustrated example, the handwriting recognition module 350 may recognize the digital ink strokes as including the following text: "Start"—"No"—"Do"—"I"—"want"—"to"—"do"—"this" (as the output 750). In some embodiments, the output 750 may support additional downstream functionality or processes provided by the digital inking application 110, such as, for example, a conversion function, a proofing function, or the like. The conversion function may convert the digital ink strokes associated with the recognized text to the recognized text. As one example, when the handwriting recognition module 350 recognizes digital ink strokes as representing the word "dog," the digital inking application 110 may perform the conversion function by converting the digital ink strokes representing the word "dog" to text representing the word "dog" (for example, by replacing the digital ink strokes with typed text representing the word "dog"). The proofing function may include, for example, a spell check function, a grammar check function, or another proofing related function. As one example, when the recognized text includes a spelling error, the digital inking application 110 may perform the proofing function by providing a suggested revision that corrects the spelling error.

As noted above, the stroke classification module 303 may provide one or more digital ink objects classified as drawing objects (for example, the drawing object 535 of FIG. 5) to the drawing parser module 307, and, as illustrated in FIG. 4, the drawing parser module 307 includes the drawing object detection module 340. The drawing object detection module 340 analyzes the drawing object(s) and performs object detection on the drawing object(s). In some embodiments, the drawing object detection module 340 may determine or perform a classification for each drawing object. In such embodiments, the drawing object detection module 340 may implement a classification model or engine for performing the classification of each drawing object. As one example, the drawing object detection module 340 may classify or identify a shape associated with a drawing object (such as a circle, an oval, a square, a star, an arrow, and the like). As another example, the drawing object detection module 340 may identify or classify the drawing object as a custom doodle or sketch of an object.

As illustrated in FIG. 4, the drawing parser module 337 may also provide (or contribute to) the output 750. Although not illustrated in FIG. 4, in some embodiments, the drawing parser module 337 may provide (or contribute) a classification of the drawing object(s) as the output 750 (or as part of the output 750). In some embodiments, the classification of the drawing object(s) may support additional downstream functionality or processes provided by the digital inking application 110, such as, for example, a drawing edit function, a drawing conversion function, or the like. A drawing edit function may include, for example, smoothing a line or edge of a drawing object, beautifying a drawing object, and the like. As one example, when a drawing object is classified as a circle, the digital inking application 110 may perform the drawing edit function on the drawing object by smoothing the edges of the circle. A drawing conversion function may include, for example, replacing the drawing object with a shape, an icon, a stored drawing, a stock image, or the like. As one example, when a drawing object is classified as a stop sign, the digital inking application 110 may perform the drawing conversion function on the drawing object by replacing the drawing object with a stock image of a stop sign.

Figure 8:
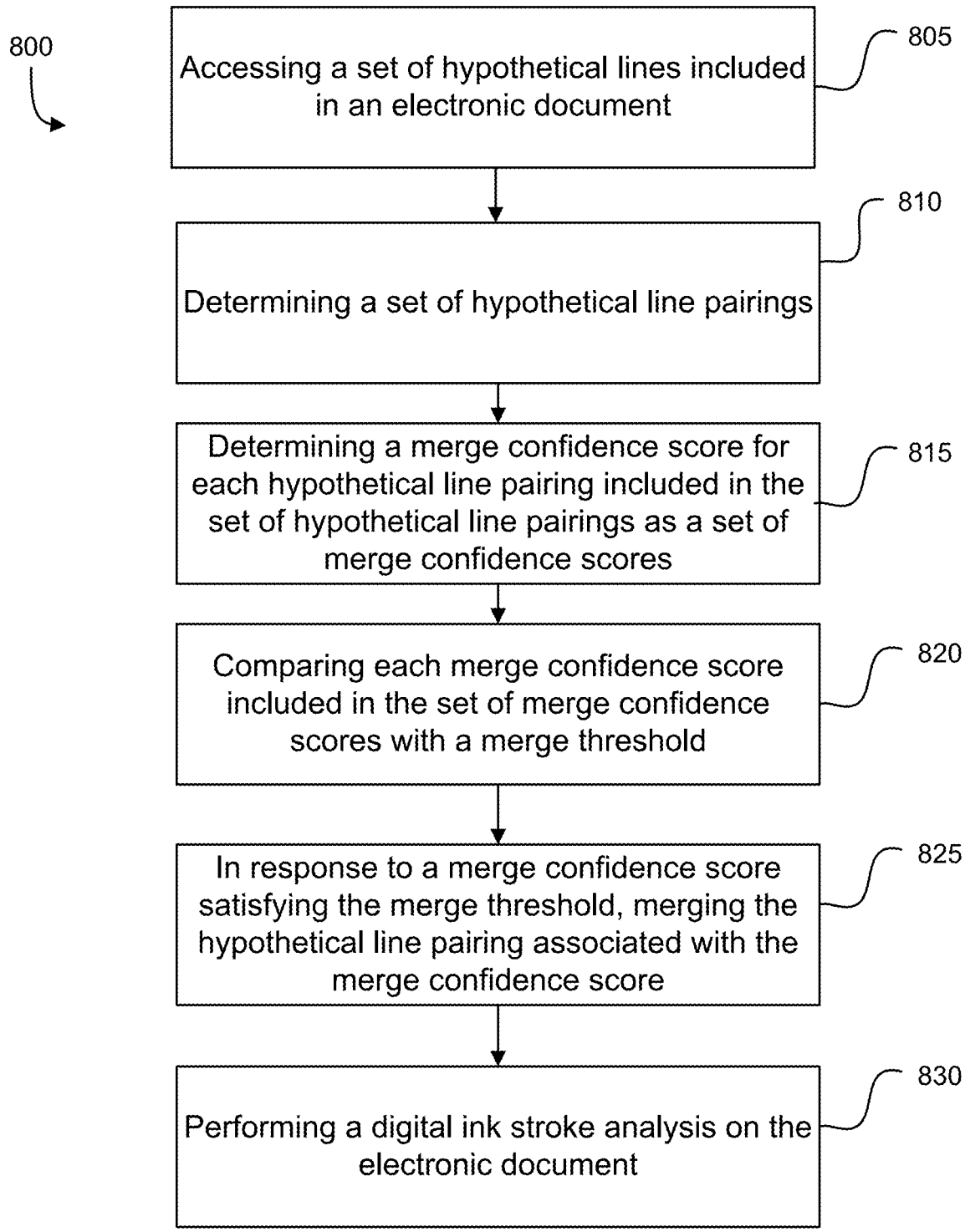
FIG. 8 is a flowchart illustrating a method of performing spatial line grouping on digital ink strokes using the digital inking system of FIG. 1 according to some embodiments.

Returning to the spatial line grouping module 320, FIG. 8 is a flowchart illustrating a method 800 of performing spatial line grouping on digital ink strokes according to some embodiments. The method 800 is described as being performed by the digital inking application 110 (and the components described herein with respect to FIGS. 3-4, such as, for example, the spatial line grouping module 320) as executed by the electronic processor 204 of the user computing device 105 (e.g., by executing the spatial line grouping module 320). However, as noted above, in some embodiments, the method 800 or portions thereof may be performed by the digital inking service 130 provided via the server 140.

As illustrated in FIG. 8, the method 800 includes accessing a set of hypothetical lines included in an electronic document (at block 805). As described in greater detail above, the temporal line grouping module 315 determines or generates one or more hypothetical lines (for example, a set of hypothetical lines). As noted above, a hypothetical line includes a set of digital ink strokes (or digital writing strokes) representing a text line. In some embodiments, the set of hypothetical lines is stored in the memory 206 of the user computing device 105 (by the temporal line grouping module 315). Accordingly, in some embodiments, the electronic processor 204 accesses (or receives) the set of hypothetical lines from the memory 206 of the user computing device 105. It should be understood, however, that the spatial line grouping module 320 can access the generated hypothetical lines in various ways.

Figure 9:
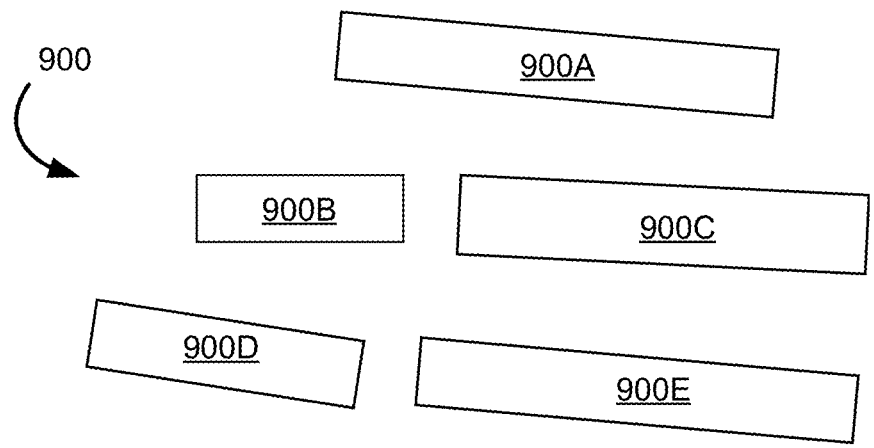
FIG. 9 illustrates a set of hypothetical lines according to some embodiments.

As one example, FIG. 9 illustrates a set of hypothetical lines 900. In the illustrated example, the set of hypothetical lines 900 includes a first hypothetical line 900A, a second hypothetical line 900B, a third hypothetical line 900C, a fourth hypothetical line 900D, and a fifth hypothetical line 900E.

Figure 10:
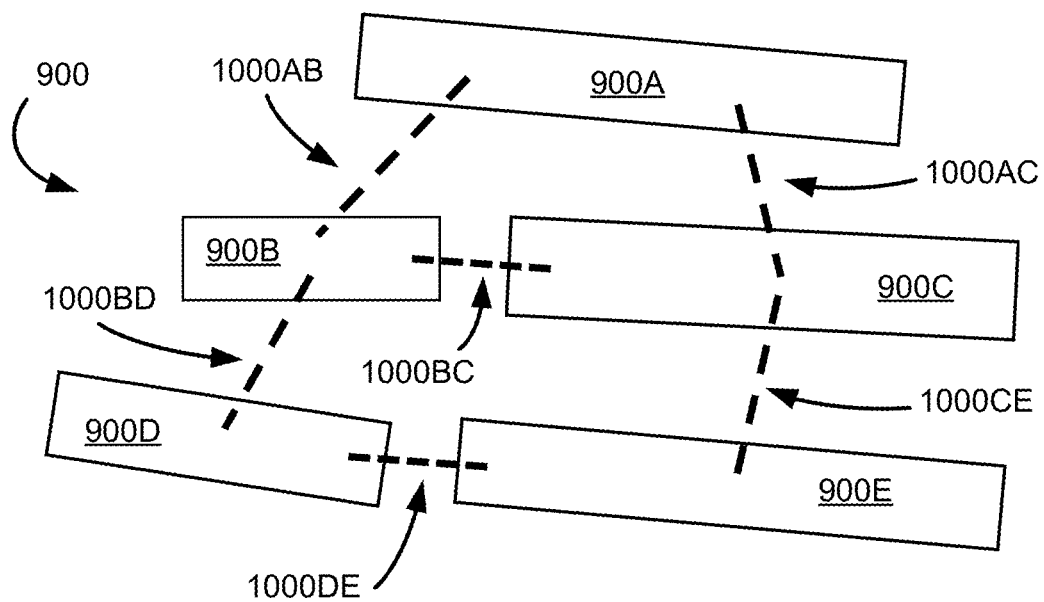
FIG. 10 illustrates a set of hypothetical line pairings for the set of hypothetical lines of FIG. 9 according to some embodiments.

After accessing (or receiving) the set of hypothetical lines 900 (at block 805), the electronic processor 204 determines a set of hypothetical line pairings (at block 810). Each hypothetical line pairing includes two lines: a hypothetical line and a neighboring hypothetical line. For example, FIG. 10 illustrates hypothetical line pairings 1000 with respect to the set of hypothetical lines 900. In the illustrated example, the hypothetical line pairings 1000 include a first hypothetical line pairing 1000AB, a second hypothetical line pairing 1000AC, a third hypothetical line pairing 1000BC, a fourth hypothetical line pairing 1000BD, a fifth hypothetical line pairing 1000CE, and a sixth hypothetical line pairing 1000DE. The first hypothetical line pairing 1000AB includes the first hypothetical line 900A and the second hypothetical line 900B. The second hypothetical line pairing 1000AC includes the first hypothetical line 900A and the third hypothetical line 900C. The third hypothetical line pairing 1000BC includes the second hypothetical line 900B and the third hypothetical line 900C. The fourth hypothetical line pairing 1000BD includes the second hypothetical line 900B and the fourth hypothetical line 900D. The fifth hypothetical line pairing 1000CE includes the third hypothetical line 900C and the fifth hypothetical line 900E. The sixth hypothetical line pairing 1000DE includes the fourth hypothetical line 900D and the fifth hypothetical line 900E.

In some embodiments, the electronic processor 204 determines the set of hypothetical line pairings by iterating through each hypothetical line included in the set of hypothetical lines 900 and identifying at least one neighboring hypothetical line. Alternatively, in some embodiments, the electronic processor 204 determines the set of hypothetical line pairings by determining closest neighboring hypothetical lines. In such embodiments, the electronic processor 204 determines, for a particular hypothetical line, one or more closest neighboring hypothetical lines to that particular hypothetical line. Determining hypothetical line pairings using closest neighboring hypothetical lines creates efficiencies by reducing a total number of hypothetical lines considered as potential neighboring hypothetical lines for a particular hypothetical line. In other words, limiting the possible neighboring hypothetical lines to those closest to the particular hypothetical line reduces a total number of hypothetical lines considered as potential neighboring hypothetical lines (as opposed to considering every possible hypothetical line as a possible neighbor for the particular hypothetical line).

Figure 11A:
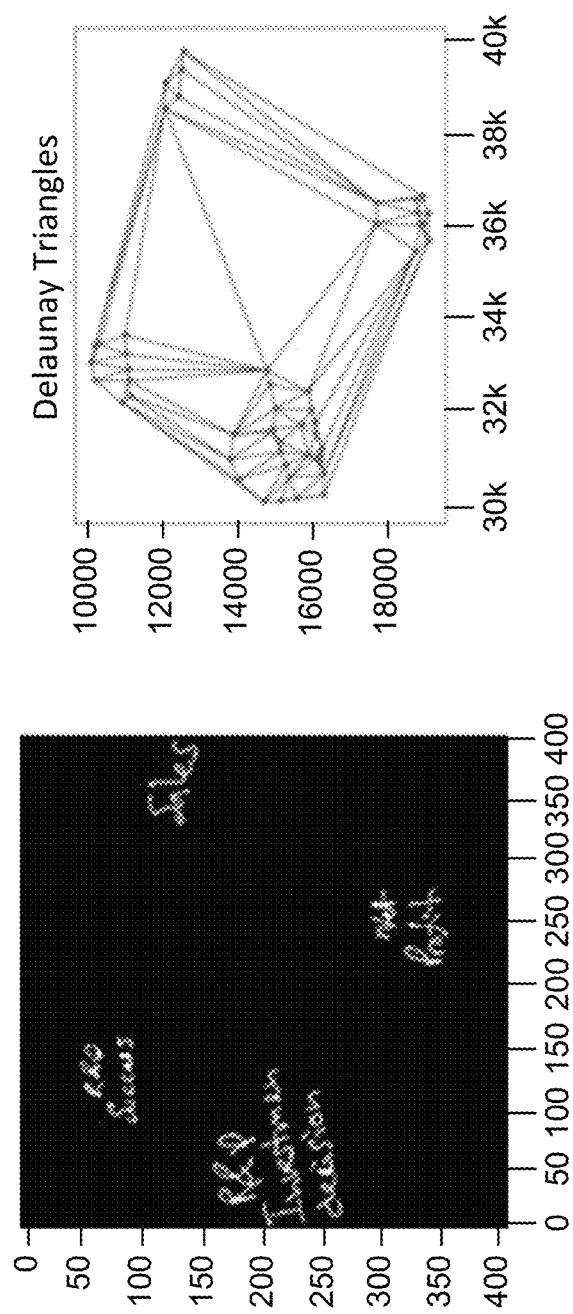
FIGS. 11A and 11B illustrate using Delaunay Triangulation to determine hypothetical line pairings according to some embodiments.
Figure 11B:
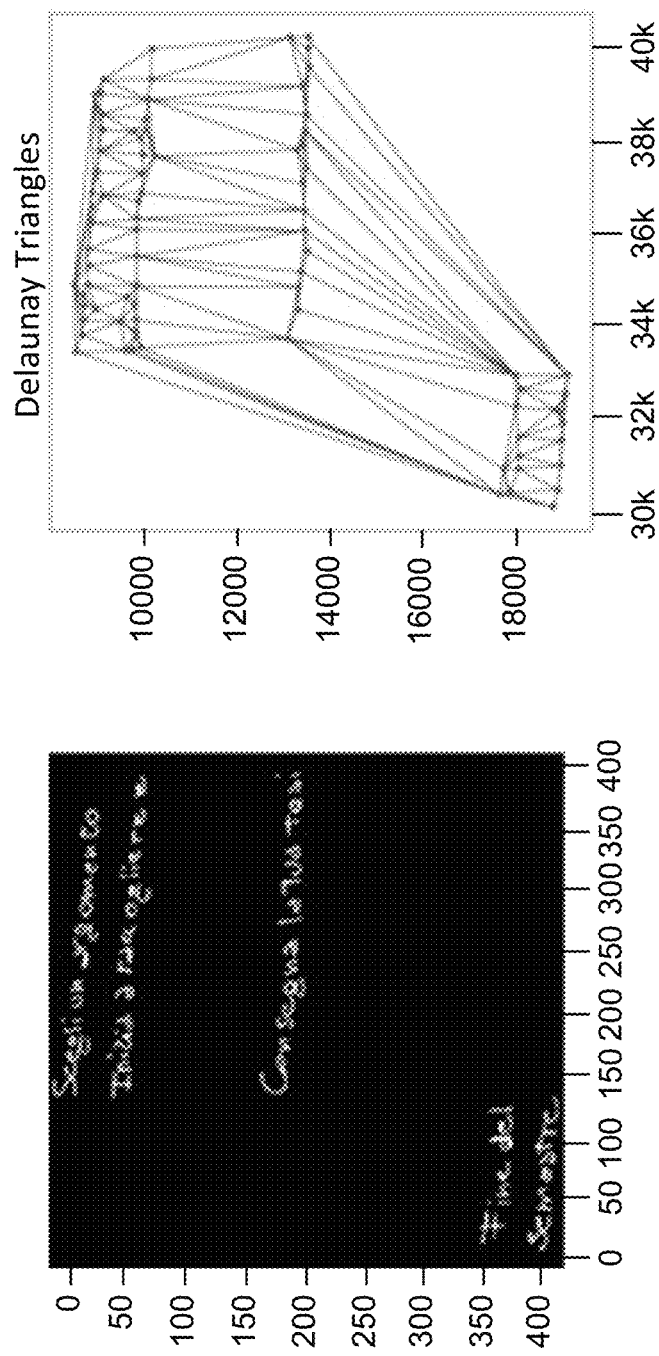

In some embodiments, the electronic processor 204 determines hypothetical line pairings using Delaunay Triangulation. In such embodiments, the electronic processor 204 creates a triangular mesh with each digital ink stroke as a vertex, where the centroid (average_x and average_y) of each stroke is a vertex. For each digital ink stroke in a particular hypothetical line, the electronic processor 204 may determine all lines that have one or more strokes being a neighbor to each digital ink stroke according to the triangular mesh. The electronic processor 204 may then pair the identified lines and the particular hypothetical line as a hypothetical line pairing. In some embodiments, the electronic processor 204 repeats this process for each hypothetical line. FIGS. 11A-11B illustrate using Delaunay Triangulation to determine hypothetical line pairings for two different example sets of hypothetical lines.

As illustrated in FIG. 8, after identifying the closest neighbor(s) for each hypothetical line, the electronic processor 204 determines a merge confidence score for each hypothetical line pairing included in the set of hypothetical line pairings (as a set of merge confidence scores) (at block 815). A merge confidence score represents a confidence in or associated with merging the hypothetical lines included in a hypothetical line pairing as representing a single text line (for example, whether the hypothetical lines included in the hypothetical line pairing should form a text line or line grouping). For example, a high merge confidence score may represent a high likelihood that an author of the digital ink strokes included in the hypothetical line pairing intended the digital ink strokes to be a text line (or line grouping). A low merge confidence score may represent a low likelihood that an author of the digital ink strokes included in the hypothetical line pairing intended the digital ink strokes to be a text line (or line grouping).

The electronic processor 204 uses a gradient boosting (or boosted) tree model to determine the merge confidence score(s). Gradient boosting is a machine learning technique for optimizing a predictive value of a model through successive steps in the learning process. In gradient boosting, an ensemble of weak learners or models (for example, weak decision trees) is used to improve the performance of a machine learning model (for example, a prediction model). Accordingly, a gradient boosted decision tree or model is an ensemble of numerous weak prediction models or learners (for example, weak decision trees). The weak decision trees work sequentially, where each weak decision tree aims to improve on an error or residual (with respect to ground truth) from the previous weak decision tree. Accordingly, gradient boosting involves implementing multiple weak models (in a sequential manner) and aggregating their results, where the aggregated result is better (or stronger) than any single result from one of the weak models.

In some embodiments, the electronic processor 204, as part of implementing the gradient boosting tree model, extracts one or more features associated with each hypothetical line pairing, which the tree model uses to predict a probability of merging two hypothetical lines. In some embodiments, 10 features are used and 150 trees are included in the ensemble. Other number of features and trees are also possible. The one or more extracted features may include, for example, an intersect feature, a contain feature, an angle difference feature, a left indent feature, a right indent feature, a horizontal overlap feature, a vertical overlap or gap feature, a width ratio feature, a wider aspect ratio, and a narrower aspect ratio. These features will be described herein with reference to FIG. 12, which illustrates an example hypothetical line pairing 1200 including a first hypothetical line 1200A and a second hypothetical line 1200B.

The intersect feature describes whether the hypothetical lines included in the hypothetical line pairing experience a two-dimensional intersection. The electronic processor 204 may assign a "1" to the intersect feature when the hypothetical lines included in the hypothetical line pairing experience a two-dimensional intersect. The electronic processor 204 may assign a "0" as the intersect feature when the hypothetical lines included in the hypothetical line pairing do not experience a two-dimensional intersect. In the example illustrated in FIG. 12, the first hypothetical line 1200A and the second hypothetical line 1200B experience a two-dimensional intersect at point 1205. According to the illustrated example, the electronic processor 204 may assign a "1" to the intersect feature for the hypothetical line pairing 1200 of FIG. 12.

Figure 12:
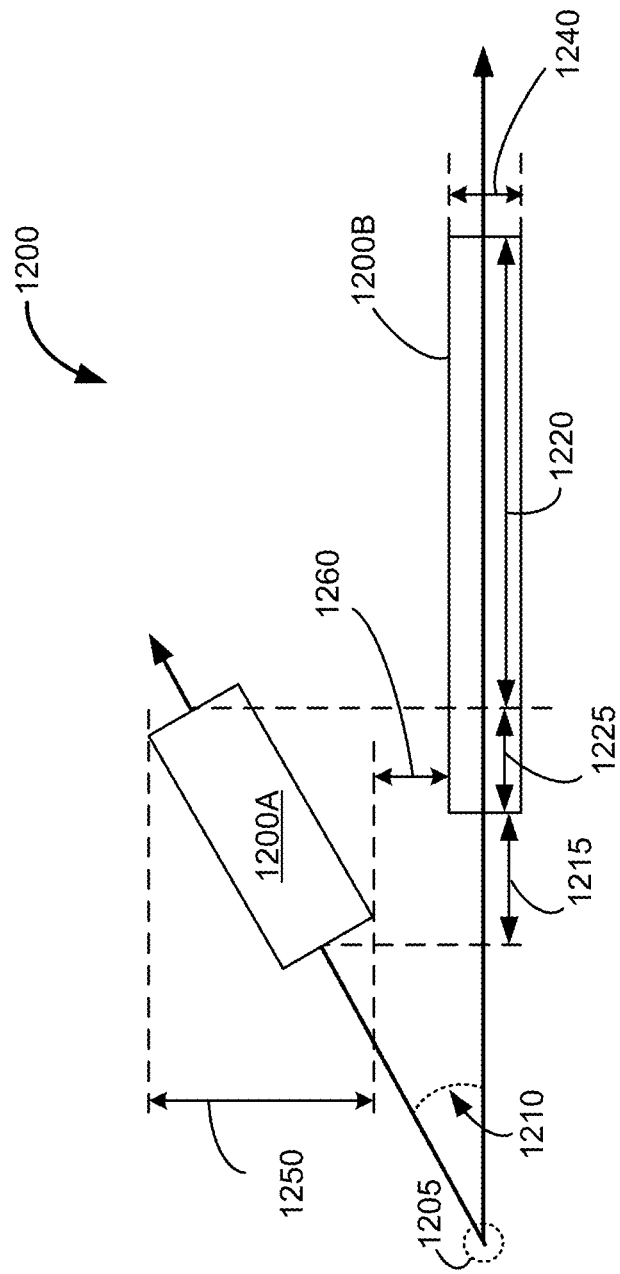
FIG. 12 illustrates an example hypothetical line pairing that includes a first hypothetical line and a second hypothetical line according to some embodiments.

The contain feature describes whether the wider hypothetical line included in a pairing contains (at least partially) the narrower hypothetical line (i.e., the other line) in the pairing. The electronic processor 204 may assign a "1" to the contain feature the wider hypothetical line contains the narrower hypothetical line. The electronic processor 204 may assign a "0" as the contain feature when the wider hypothetical line does not contain the narrower hypothetical line. In the example illustrated in FIG. 12, the first hypothetical line 1200A is wider than the second hypothetical line 1200B. Accordingly, the first hypothetical line 1200A is the wider hypothetical line and the second hypothetical line 1200B is the narrower hypothetical line. As illustrated in FIG. 12, the first hypothetical line 1200A does not contain the second hypothetical line 1200B. According to the illustrated example, the electronic processor 204 may assign a "0" to the contain feature for the hypothetical line pairing 1200 of FIG. 12.

The angle difference feature describes an angle difference between hypothetical lines included in a hypothetical line pairing. In the example illustrated in FIG. 12, the first hypothetical line 1200A is at an angle (represented in FIG. 12 as reference numeral 1210) relative to the second hypothetical line 1200B. According to the illustrated example, the electronic processor 204 may determine an angle difference (for example, the angle represented by reference numeral 1210 in FIG. 12) between the first hypothetical line 1200A and the second hypothetical line 1200B. The electronic processor 204 may assign the angle difference as the value for the angle difference feature.

The left indent feature describes a left indentation of a narrower hypothetical line with respect to a wider hypothetical line and, in some embodiments, represents a left indent distance between a left end of the wider hypothetical line and a left end of the narrower hypothetical line. As noted above, with reference to FIG. 12, the first hypothetical line 1200A is the wider hypothetical line and the second hypothetical line 1200B is the narrower hypothetical line. In this example, the left indent feature represents a left indent distance 1215 between a left end of the first hypothetical line 1200A and a left end of the second hypothetical line 1200B. The electronic processor 204 may assign the left indent distance 1215 as the value for the left indent feature.

The right indent feature describes a right indentation of a narrower hypothetical line with respect to a wider hypothetical line and, in some embodiments similar to the left indent feature, the right indent feature represents a right indent distance between a right end of the wider hypothetical line and a right end of the narrower hypothetical line. As noted above, with reference to FIG. 12, the first hypothetical line 1200A is the wider hypothetical line and the second hypothetical line 1200B is the narrower hypothetical line. In this example, the right indent feature represents a right indent distance 1220 between a right end of the first hypothetical line 1200A and a right end of the second hypothetical line 1200B. The electronic processor 204 may assign the right indent distance 1220 as the value for the right indent feature.

The horizontal overlap feature describes whether hypothetical lines of a hypothetical line pairing horizontally overlap with each other. In some embodiments, the electronic processor 204 assigns a binary value that indicates whether hypothetical lines of a hypothetical line pairing horizontally overlap with each other. For example, the electronic processor 204 may assign a "1" as the horizontal overlap feature when hypothetical lines of a hypothetical line pairing horizontally overlap with each other. Alternatively, the electronic processor 204 may assign a "0" as the horizontal overlap feature when hypothetical lines of a hypothetical line pairing do not horizontally overlap with each other.

In some embodiments, the horizontal overlap feature also describes the extent to which hypothetical lines of a hypothetical line pairing horizontally overlap or do not overlap. For example, in addition to or as an alternative to assigning a binary value, the electronic processor 204 may assign a positive or negative value to the horizontal overlap feature, where the positive or negative component of the value describes whether the hypothetical lines of a hypothetical line pairing horizontally overlap and the value describes a distance or amount (for example, a horizontal distance) that the hypothetical lines of the hypothetical line pairing do or do not horizontally overlap. As one example, when hypothetical lines of a hypothetical line pairing horizontally overlap by a particular horizontal distance, the electronic processor 204 may assign a positive value representing the particular horizontal distance as the horizontal overlap feature. As another example, when the hypothetical lines of a hypothetical line pairing do not horizontally overlap and a horizontal distance between the hypothetical lines is a particular horizontal distance, the electronic processor 204 may assign a negative value representing the particular horizontal distance as the horizontal overlap feature.

In the example illustrated in FIG. 12, the first hypothetical line 1200A and the second hypothetical line 1200B horizontally overlap with each other (for example, a right side of the first hypothetical line 1200A horizontally overlaps with a left side of the second hypothetical line 1200B). The distance or amount in which the first hypothetical line 1200A and the second hypothetical line 1200B horizontally overlap with each other may be represented by a horizontal overlap distance 1225.

The vertical overlap or gap feature describes whether hypothetical lines of a hypothetical line pairing vertically overlap with each other. For example, with reference to FIG. 12, the first hypothetical line 1200A and the second hypothetical line 1200B do not vertically overlap with each other. Accordingly, in some embodiments, the electronic processor 204 assigns a binary value that indicates whether hypothetical lines of a hypothetical line pairing vertically overlap with each other. For example, the electronic processor 204 may assign a "1" as the vertical overlap feature when hypothetical lines of a hypothetical line pairing vertically overlap with each other. Alternatively, the electronic processor 204 may assign a "0" as the vertical overlap feature when hypothetical lines of a hypothetical line pairing do not vertically overlap with each other.

In some embodiments, the vertical overlap feature also describes the extent to which hypothetical lines of a hypothetical line pairing vertically overlap or don't overlap with each other. For example, in addition to or as an alternative to assigning a binary value, the electronic processor 204 may assign a positive or negative value to the vertical overlap feature, where the positive or negative component of the value describes whether the hypothetical lines of a hypothetical line pairing vertically overlap and the value describes a distance or amount (for example, a vertical overlap distance) that the hypothetical lines of the hypothetical line pairing do or do not vertically overlap. In the example illustrated in FIG. 12, the first hypothetical line 1200A and the second hypothetical line 1200B do not vertically overlap each other.

For example, in some embodiments, the electronic processor 204 determines the vertical overlap distance by identifying a hypothetical line with a larger width (for example, the wider hypothetical line 1200A of FIG. 12). The electronic processor 204 determines a width 1240 of the narrower hypothetical line 1200B, where the width 1240 may be set as a base. The electronic processor 204 may then determine a vertical distance 1250. As illustrated in FIG. 12, the vertical distance 1250 represents a vertical distance covered by a bounding box of the wider hypothetical line 1200A. The electronic processor 204 may then determine a vertical overlap or gap distance 1260, as illustrated in FIG. 12. The electronic processor 204 may determine the vertical overlap distance as a ratio between the vertical overlap or gap distance 1260 and the width 1240 of the narrower hypothetical line 1200B (for example, the vertical overlap or gap distance 1260 divided by the width 1240). Accordingly, in some embodiments, the vertical overlap feature may be a ratio. Additionally, in some embodiments, the electronic processor 204 may implement a similar process (as described herein with respect to determining the vertical overlap feature) for determining the horizontal overlap feature.

The width ratio feature describes a ratio between widths of hypothetical lines of hypothetical line pairings. For example, when a hypothetical line pairing includes a wider hypothetical line and a narrower hypothetical line, the electronic processor 204 may determine a width ratio between the width of the wider hypothetical line and the narrower hypothetical line. The electronic processor 204 may determine the width ratio by dividing a width associated with the wider hypothetical line (for example, a wider width) by a width associated with the narrower hypothetical line (for example, a narrower width). In the example illustrated in FIG. 12, the electronic processor 204 may determine the width ratio by dividing a width of the first hypothetical line 1200A by a width of the second hypothetical line 1200B. The electronic processor 204 may assign the width ratio as the value for the width ratio feature.

The wider aspect ratio feature describes an aspect ratio (for example, a ratio of width to height) with respect to a rotated bounding box of a wider hypothetical line of a hypothetical line pairing. In the example illustrated in FIG. 12, the wider aspect ratio feature describes an aspect ratio with respect to the first hypothetical line 1200A (as the wider line).

The narrower aspect ratio feature describes an aspect ratio with respect to a rotated bounding box of a narrower hypothetical line of a hypothetical line pairing. In the example illustrated in FIG. 12, the narrower aspect ratio feature describes an aspect ratio with respect to the second hypothetical line 1200B (as the narrower line).

When implementing the tree ensemble, one or more of the above features are extracted from training data including digital ink strokes and identified text lines. The tree included in the ensemble are created based on these extracted features. Once trained, the tree ensemble can be used to predict whether to merge a pair of hypothetical lines.

Figure 13:
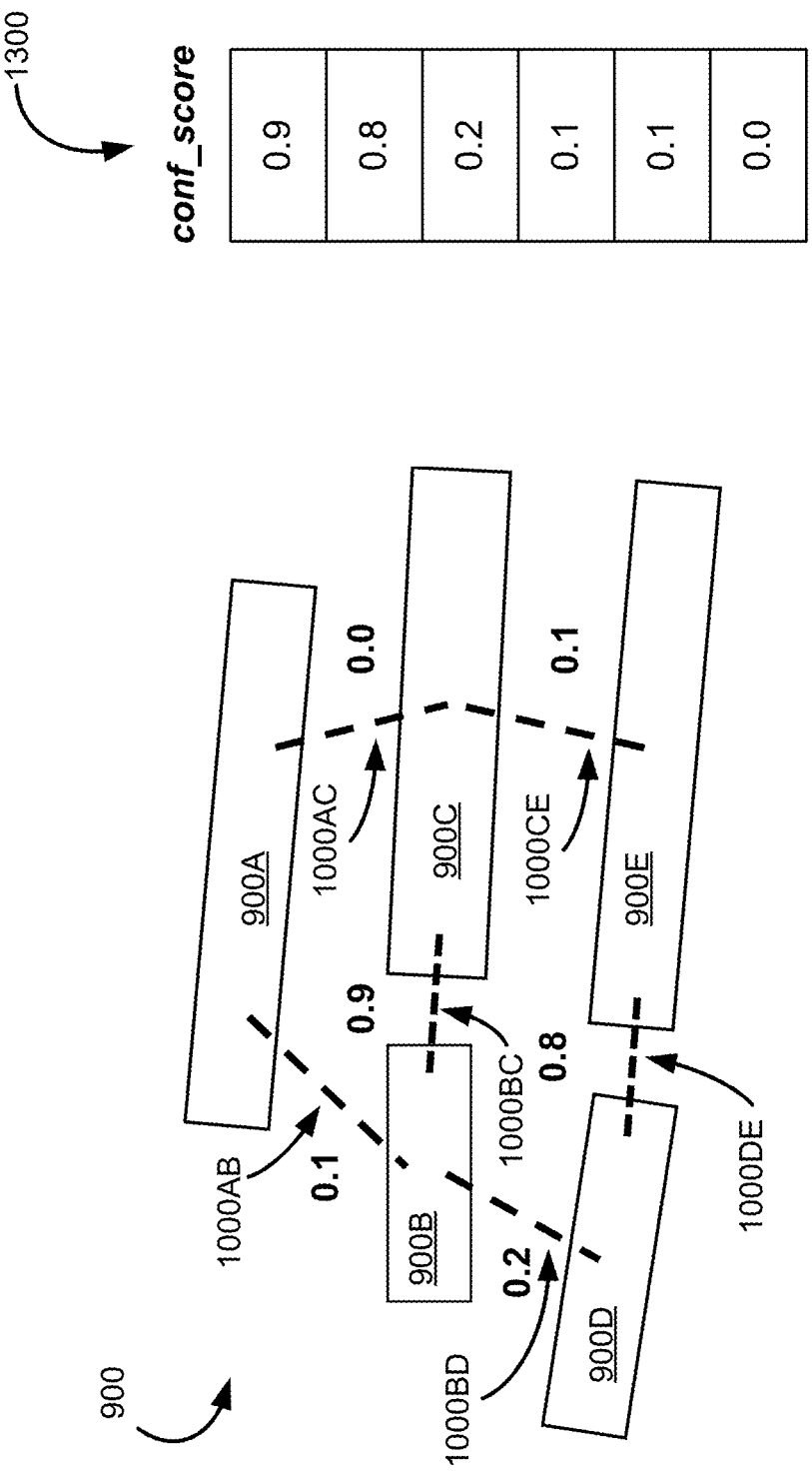
FIG. 13 illustrates a set of merge confidence scores for the set of hypothetical line pairings of FIG. 10 according to some embodiments.

For example, as noted above, in some embodiments, the electronic processor 204 determines, using the trained tree ensemble, a merge confidence score for each hypothetical line pairing included in the set of hypothetical line pairings as a set of merge confidence scores (at block 815). FIG. 13 illustrates an example set of merge confidence scores 1300 for the set of hypothetical line pairings 1000. As illustrated in FIG. 13, the first hypothetical line pairing 1000AB has a merge confidence score of 0.1, the second hypothetical line pairing 1000AC has a merge confidence score of 0.0, the third hypothetical line pairing 1000BC has a merge confidence score of 0.9, the fourth hypothetical line pairing 1000BD has a merge confidence score of 0.2, the fifth hypothetical line pairing 1000CE has a merge confidence score of 0.1, and the sixth hypothetical line pairing 1000DE has a merge confidence score of 0.8.

Returning to FIG. 8, after determining a merge confidence score for each hypothetical line pairing included in the set of hypothetical line pairings (at block 815), the electronic processor 204 commits the merge conferences scores to a map, such as an ordered map 1300 (see, e.g., FIG. 14) and compares the highest conference score in the map 1300 with a merge threshold (at block 820). The merge threshold may be a predetermined probability threshold, such as, for example, 0.5. While the highest merge confidence score in the map 1300 satisfies the merge threshold, the hypothetical lines included in the hypothetical line pairing associated with the highest merge confidence score are merged as a single line grouping. In some embodiments, the merge threshold is satisfied when a merge confidence score is equal to the merge threshold. Alternatively or in addition, in some embodiments, the merge threshold is satisfied when a merge confidence score exceeds the merge threshold.

Figure 14:
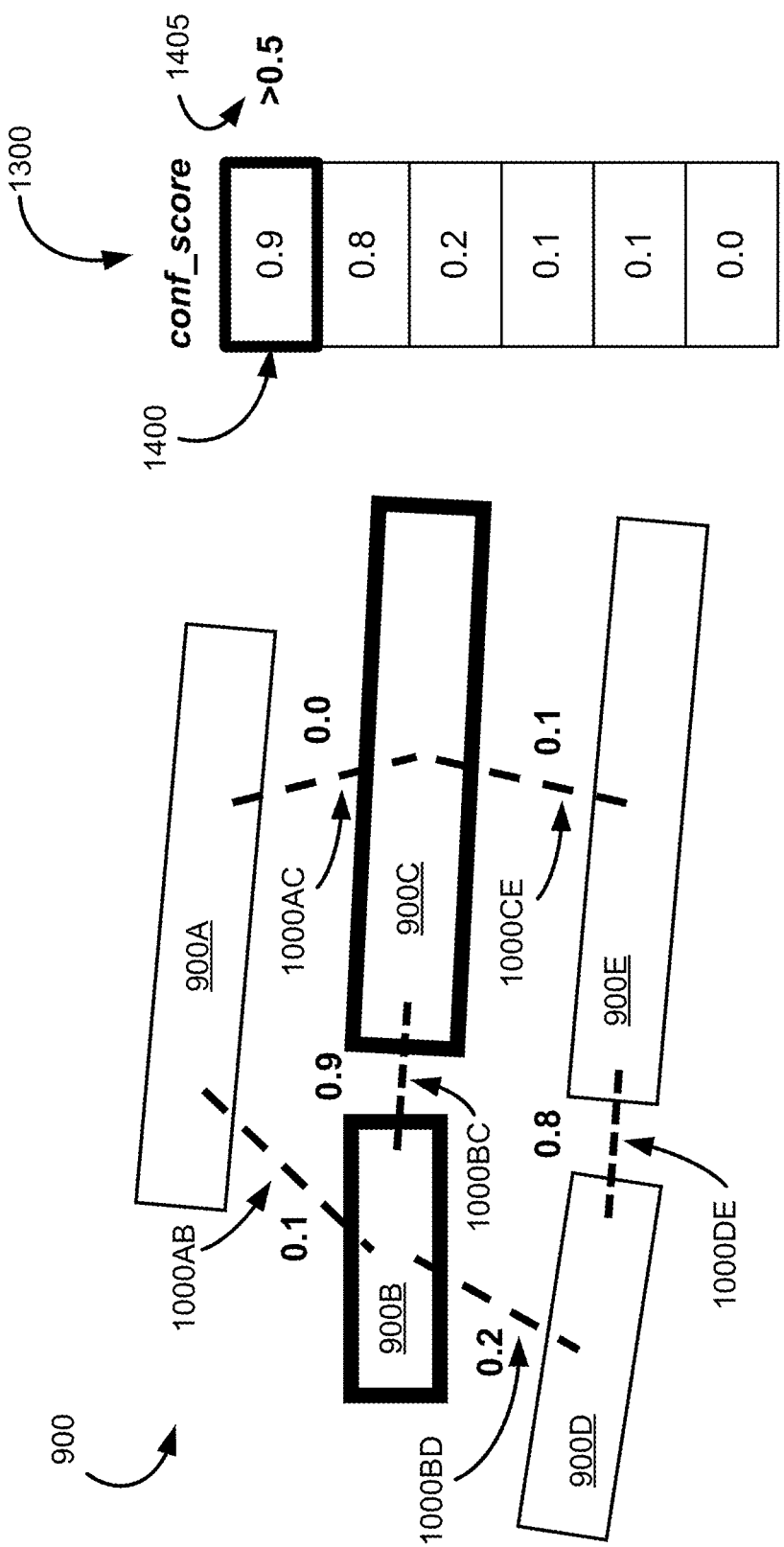
FIG. 14 illustrates a merge threshold according to some embodiments.

As one example using the example illustrated in FIG. 14, the electronic processor 204 may compare the highest merge confidence score in the ordered map 1300 (score 1400) to a merge threshold 1405. In the example illustrated in FIG. 14, the merge threshold 1405 is 0.5 and the highest merge confidence score 1400 is 0.9. As illustrated in FIG. 14, the first merge confidence score 1400 is associated with the third hypothetical line pairing 1000BC, which includes the second hypothetical line 900B and the third hypothetical line 900C. According to this example, the first merge confidence score 1400 exceeds (or satisfies) the merge threshold 1405 (since 0.9 is greater than 0.5). Therefore, following this example, the electronic processor 204 determines that the second hypothetical line 900B and the third hypothetical line 900C should be merged to form a single line grouping.

Figure 15:
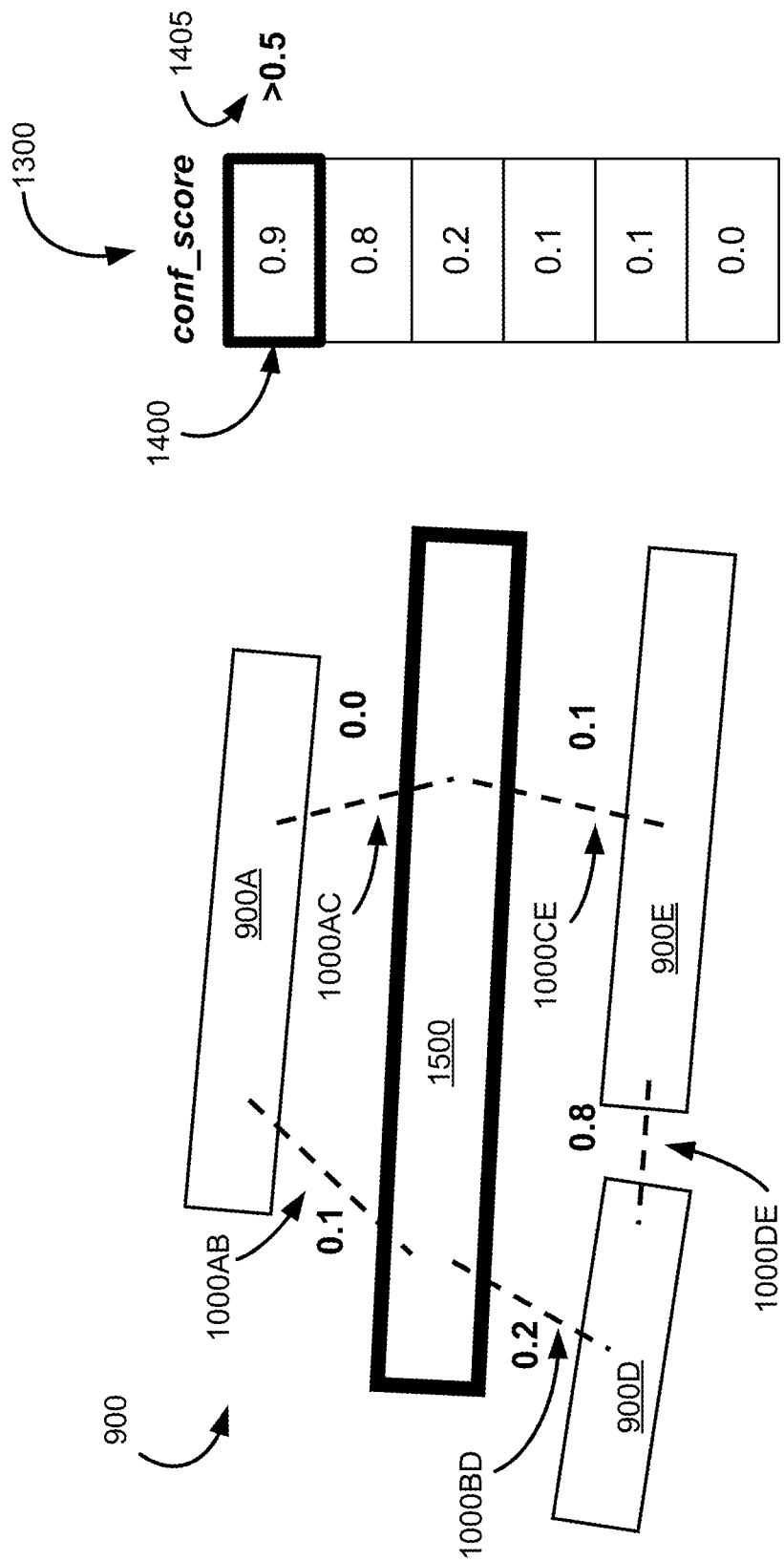
FIG. 15 illustrates a first line grouping formed from at least one hypothetical line pairing included in the set of hypothetical line pairings of FIG. 10 according to some embodiments.

Accordingly, as illustrated in FIG. 8, in response to the highest merge confidence score satisfying the merge threshold, the electronic processor 204 merges the hypothetical line pairing associated with the highest merge confidence score (i.e., the hypothetical lines included in the hypothetical line pairing) (at block 825). For example, FIG. 15 illustrates the second hypothetical line 900B and the third hypothetical line 900C merged to form a line grouping (for example, a first line grouping 1500).

After merging a hypothetical line pairing, the electronic processor 204 updates the set of hypothetical line pairings and generates new merge confidence scores for the ordered map 1300 based on the updated set of line pairings. In particular, the electronic processor 204 updates the map 1300 by repeating blocks 810 and 815 of the method 800 illustrated in FIG. 8. It should be understood that this updating of pairings and associates scores identifies whether an additional line should be merged with a previously merged line. In other words, although the electronic processor 204 could be configured to generate the ordered map once and merge all line pairings representing the map satisfying the threshold, this process would, at most, merge two lines. However, in some situations, more than three hypothetical lines may be identified by the temporal line grouping module that should be merged into a single text line based on their spatial positions. Thus, updating pairings and then creating a new ordered map based on the confidence scores for the updated pairings configures the electronic processor 204 to properly identify and merge any number of hypothetical lines that should be merged.

Figure 16:
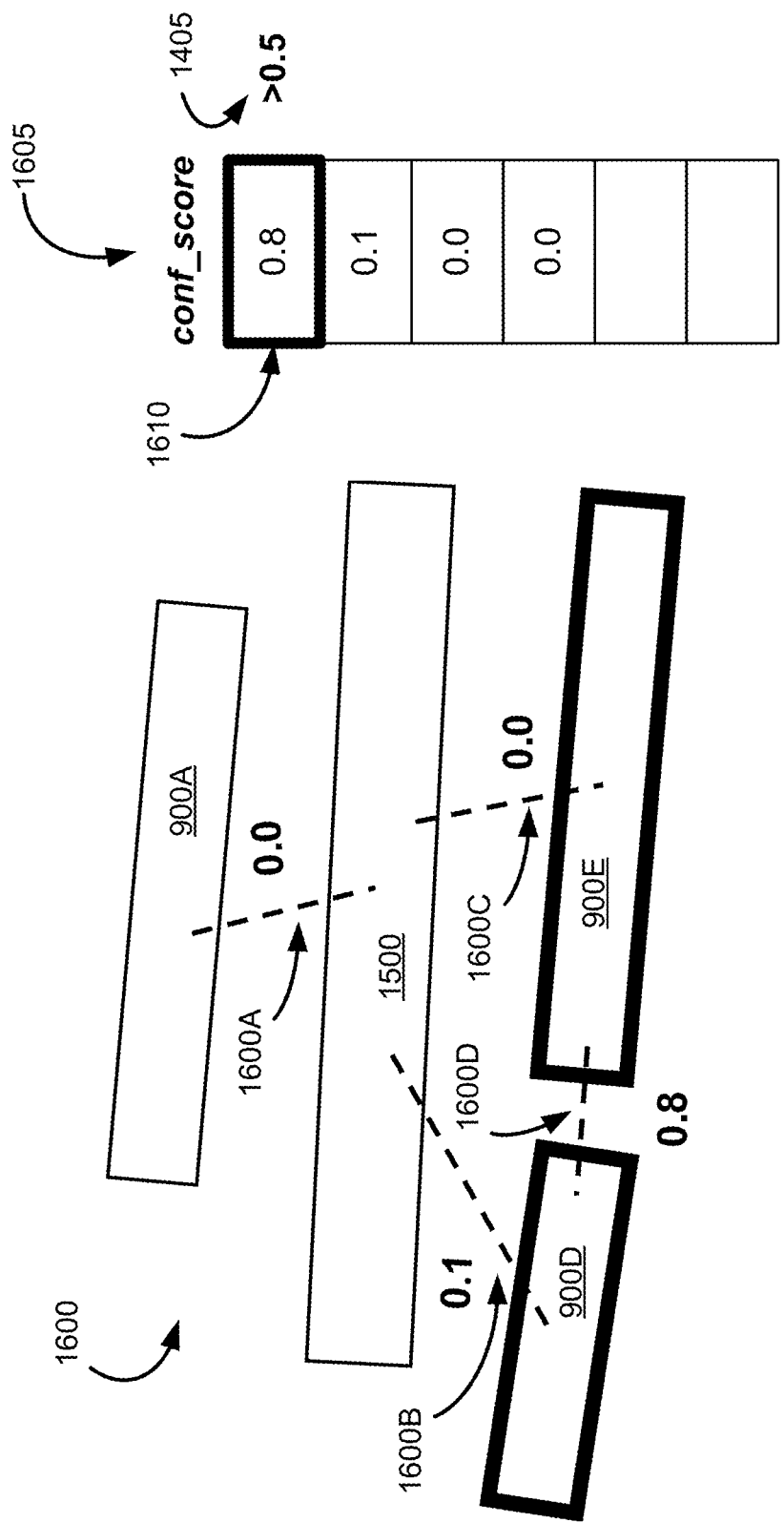
FIG. 16 illustrates an updated set of hypothetical line pairings and an updated set of merge confidence scores according to some embodiments.

For example, with reference to FIG. 16, the electronic processor 204 may determine a new set of hypothetical line pairings 1600, including a first new hypothetical line pairing 1600A, a second new hypothetical line pairing 1600B, a third new hypothetical line pairing 1600C, and a fourth new hypothetical line pairing 1600D. As illustrated in FIG. 16, the first new hypothetical line pairing 1600A includes the first hypothetical line 900A and the first line grouping 1500. The second new hypothetical line pairing 1600B includes the first line grouping 1500 and the fourth hypothetical line 900D. The third new hypothetical line pairing 1600C includes the first line grouping 1500 and the fifth hypothetical line 900E. The fourth new hypothetical line pairing 1600D includes the fourth hypothetical line 900D and the fifth hypothetical line 900E. As also illustrated in FIG. 16, the electronic processor 204 also generates or determines an updated set of merge confidence scores associated with the new set of hypothetical line pairings 1600, which may be organized in an updated ordered map 1605. The updated set of merge confidence scores included in the updated ordered map 1605 includes merge confidence scores associated with each of the new hypothetical line pairings 1600. For example, as illustrated in FIG. 16, the first new hypothetical line pairing 1600A has a merge confidence score of 0.0, the second new hypothetical line pairing 1600B has a merge confidence score of 0.1, the third new hypothetical line pairing 1600C has a merge confidence score of 0.0, and the fourth new hypothetical line pairing 1600D has a merge confidence score of 0.8.

Figure 17:
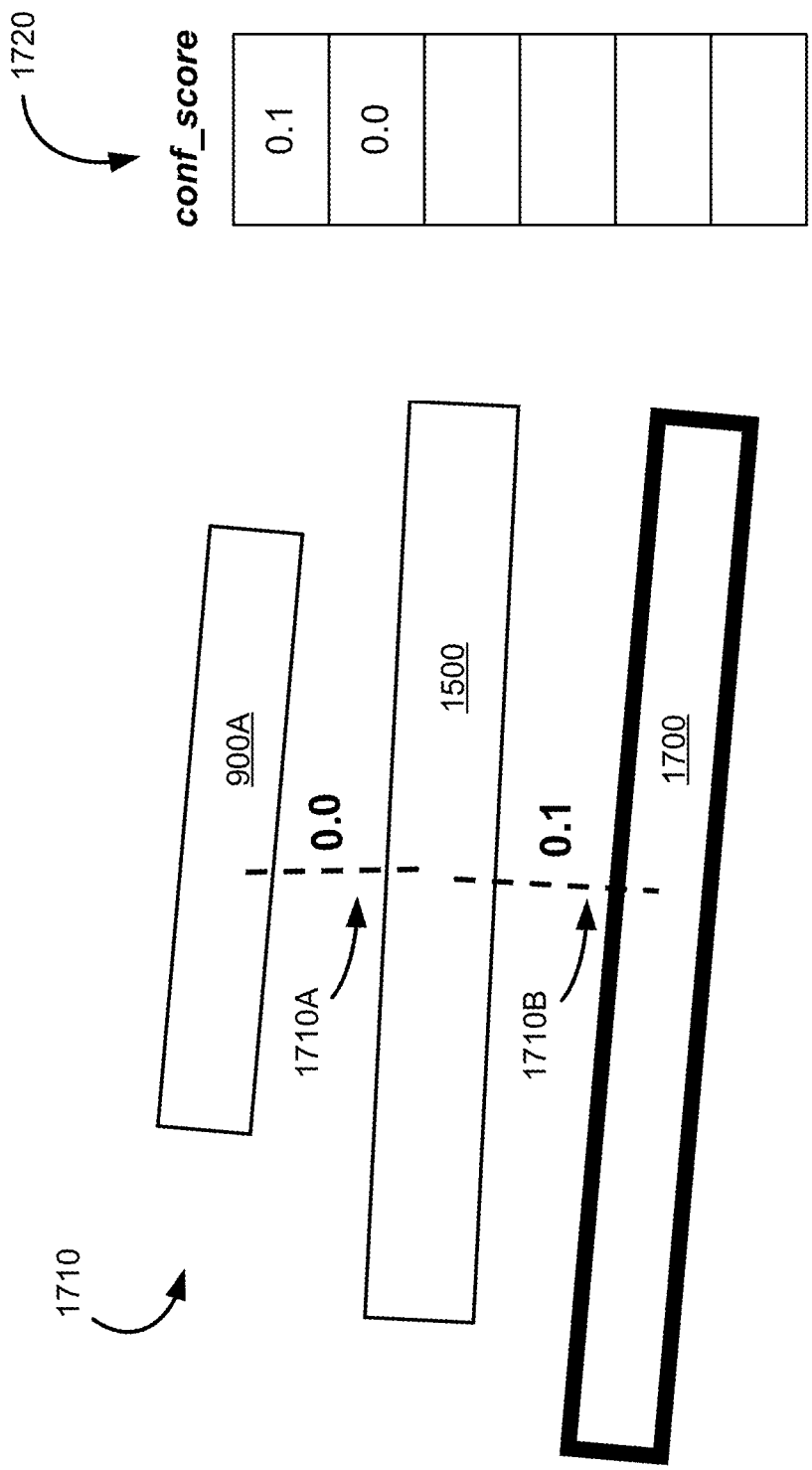
FIG. 17 illustrates a second line grouping formed from at least one hypothetical line pairing included in the updated set of hypothetical line pairings of FIG. 16 according to some embodiments.

After generating or determining the updated set of merge confidence scores, the electronic processor 204 may compare the highest merge confidence score in the updated ordered map 1605 to the merge threshold 1405, as described above with respect to block 820 of the method 800 illustrated in FIG. 8. Following the example illustrated in FIG. 16, the electronic processor 204 compares the highest merge confidence score (for example, a second merge confidence score 1610) associated with the fourth new hypothetical line pairing 1600D to the merge threshold 1405. As illustrated in FIG. 16, the second merge confidence score 1610 is 0.8 and the merge threshold 1405 is 0.5. According to this example, since 0.8 is greater than 0.5, the second merge confidence score 1610 satisfies (or exceeds) the merge threshold 1405. Therefore, following this example, the electronic processor 204 determines that the fourth hypothetical line 900D and the fifth hypothetical line 900E should be merged to form a single line grouping. In response to determining that the second merge confidence score 1610 satisfies (or exceeds) the merge threshold 1405, the electronic processor 204 may merge the fourth hypothetical line 900D and the fifth hypothetical line 900E to form a second line grouping 1700, as illustrated in FIG. 17.

As illustrated in FIG. 8, the electronic processor 204 continues to iteratively update the set of hypothetical line pairings and the corresponding set of merge confidence scores (for example, repeat one or more of blocks 810-825) until a highest score in a generated ordered map fails to satisfy the merge threshold. For example, as illustrated in FIG. 17, after merging the fourth hypothetical line 900D and the fifth hypothetical line 900E to form the second line grouping 1700, the electronic processor 204 updates the set of hypothetical line pairings 1710 (represented in FIG. 17 by reference numerals 1710A and 1710B) and the corresponding set of merge confidence scores in an ordered map 1720. As illustrated in FIG. 17, none of the merge confidence scores included in the ordered map 1720 exceed (or satisfy) the merge threshold 1450 of 0.5.

In some embodiments, in response to the electronic processor 204 determining that the highest merge confidence score in the most recently-updated ordered map does not satisfy the merge threshold, the electronic processor 204 may commit the merged hypothetical lines (for example, the line groupings), the unmerged hypothetical lines, or a combination thereof to a document object model (DOM) or tree (such as new lineNode(s)) for the electronic document (for example, for a page or canvas of the electronic document). In the example illustrated in FIG. 17, in response to determining that none of the remaining merge confidence scores included in the ordered map 1720 satisfy the merge threshold 1450, the electronic processor 204 may commit the first line grouping 1500 and the second line grouping 1700 (as the merged hypothetical lines or line groupings), the hypothetical line 900A (as the unmerged hypothetical line), or a combination thereof as a tree for the electronic document (or canvas).

Returning to FIG. 8, the electronic processor 204 may perform a digital ink stroke analysis on the electronic document based on one or more of the line groupings (for example, the first line grouping 1500, the second line grouping 1700, or the like) (at block 830). As noted above, a digital ink stroke analysis may include, for example, a layout analysis (via the layout analysis module 325), a handwriting recognition analysis (via the handwriting recognition module 350), and the like.

In some embodiments, performance of the spatial line grouping functionality may be improved, such that, for example, latency is reduced. For example, in some embodiments, the electronic processor 204 is configured to determine a hypothetical line pairing (as described above with respect to block 810 of FIG. 8) using an inclusion region. In this embodiment, the electronic processor 204 may be configured to determine neighboring hypothetical lines as described above but may limit what pairing of hypothetical lines are actually processed as part of identifying merge opportunities. In particular, after identifying neighboring hypothetical lines as described above, the electronic processor 204 may be configured to eliminate a pairing between two neighboring hypothetical lines when one of the lines is not positioned (at least partially) within the inclusion region.

Such an inclusion region may be defined by a predetermined height or distance above, below, next to, or around a hypothetical line. For example, as one, non-limiting example, an inclusion region may be defined as area extending 0.15 inches above and below (i.e., horizontally) a hypothetical line. When a first hypothetical line (or a portion thereof) falls within the inclusion region for a second hypothetical line, the first hypothetical line may be considered or included as a possible neighboring line to the second hypothetical line and a pairing of the first and second hypothetical lines may be processed by the electronic processor 204 as described above. Alternatively, when a first hypothetical line falls outside of the inclusion region for a second hypothetical line, the first hypothetical line may not be considered (i.e., excluded from) a neighboring line to the second hypothetical line and the electronic processor 204 may not process a pairing of the first and second hypothetical lines as described above. Accordingly, using the inclusion region can reduce the number of pairings that need to be processed by the electronic processor 204, and, hence, can increase the processing speed and reduce processing resources needed to merge applicable hypothetical lines.

Figure 18:
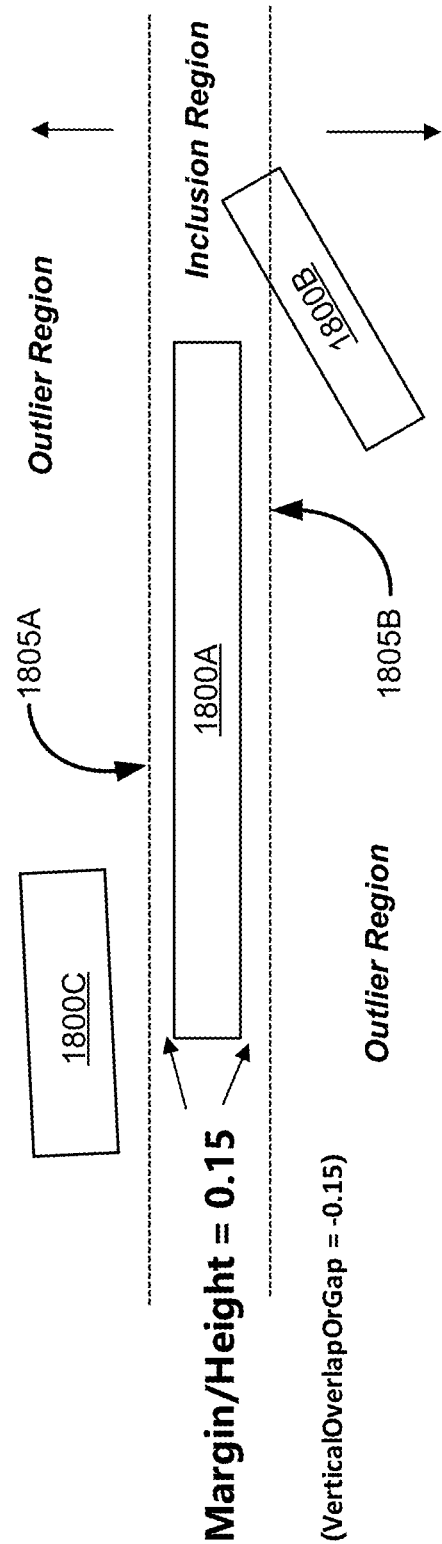
FIG. 18 illustrates a hypothetical line associated with an inclusion region according to some embodiments.

For example, FIG. 18 illustrates a first hypothetical line 1800A, a second hypothetical line 1800B, and a third hypothetical line 1800C. As illustrated in FIG. 18, the first hypothetical line 1800A is associated with an inclusion region that is defined by a top inclusion boundary 1805A and a bottom inclusion boundary 1805B. According to the illustrated example, hypothetical lines (or at least a portion thereof) positioned within the inclusion region (i.e., between the top boundary 1805A and the bottom boundary 1805B) will be considered by the electronic processor 204 as potential or possible neighboring hypothetical lines to the first hypothetical line 1800A (e.g., processed as pairings with the first hypothetical line 1800A). Accordingly, as illustrated in FIG. 18, the second hypothetical line 1800B (at least a portion thereof) is positioned within the inclusion region. Therefore, the electronic processor 204 will process a pairing of the first and second hypothetical lines 1800A and 1800B as described above to determine whether these hypothetical lines should be merged. As also illustrated in FIG. 18, the third hypothetical line 1800C (at least a portion thereof) is not positioned within the inclusion region. Therefore, the electronic processor 204 will not process a pairing between the first and third hypothetical lines 1800A and 1800C. Rather, due to the third hypothetical line 1800C being outside of the inclusion region, the third hypothetical line 1800C is removed from consideration (for example, considered an outlier hypothetical line for the first hypothetical line 1800A). As noted above, removing outlier hypothetical lines from pairing considerations optimizes or improves the performance of the methods and systems described herein. For example, by only considering pairs of hypothetical lines within a particular range or distance, the total number of hypothetical line pairings to consider is decreased, which, ultimately, decreases the overall processing time (i.e., makes the processing faster). It should be understood that the size and shape of the inclusion region can vary and can be configured based on the size of the digital strokes (e.g., letters), the size of the canvas, or other parameters of the digital inking application, the computing device, the user, or the like. In particular, the shape of the inclusion region may not, in some embodiments, be a polynomial shape. Furthermore, in some embodiments, the size, shape, or both of an inclusion region may vary between hypothetical lines identified within a canvas based on the size or position of a particular hypothetical line (for example, how close the line is positioned to an edge or corner of the canvas, how wide the hypothetical line is, and the like).

Thus, embodiments described herein provide, among other things, systems and methods for digital inking and, in particular, systems and methods for grouping digital ink strokes using spatial relationships between digital ink strokes and a gradient boosted tree model. In particular, embodiments described herein provide a gradient boosting decision tree based spatial line grouping algorithm or model on digital ink strokes. Embodiments described herein process pre-grouped digital ink strokes (hypolines) as input and output grouped lines (for example, line groupings). The pre-grouped digital ink strokes may be generated using temporal line grouping that leverages writing sequence (or temporal order) information to group digital ink strokes into hypolines. The hypolines are further grouped into grouped lines (or line groupings) using spatial line grouping that leverages spatial relations of the hypolines. In particular, embodiments described herein use gradient boosting decision tree based spatial line grouping to further group the hypolines into line groupings. The line groupings may be further fed to downstream functionalities for further intelligent analysis, such as, for example, handwritten recognizer for word level recognition. As described herein, the embodiments descried herein improves line grouping accuracy (including, for example, precision, recall, and F1 score) and word recognition rate.

Various features and advantages of some embodiments are set forth in the following claims.

What is claimed is:

1. A system for performing spatial line grouping on digital ink stokes, the system comprising:
  a memory configured to store instructions; and
  an electronic processor coupled to the memory, wherein the electronic processor, through execution of the instructions stored in the memory, is configured to:
   access a set of hypothetical lines in an electronic document, wherein each hypothetical line includes a set of digital ink strokes;
   determine, based on the set of hypothetical lines, a set of hypothetical line pairings, wherein each hypothetical line pairing includes a hypothetical line and a neighboring hypothetical line included in the set of hypothetical lines;
   determine, via a gradient boosting tree model, a merge confidence score for each hypothetical line pairing included in the set of hypothetical line pairings to create a set of merge confidence scores;
   compare a first merge confidence score included in the set of merge confidence scores with a merge threshold, wherein the first merge confidence score is a highest merge confidence score included in the set of merge confidence scores and is associated with a first hypothetical line pairing including a first hypothetical line and a first neighboring hypothetical line;
   in response to the first merge confidence score satisfying the merge threshold, merge the first hypothetical line and the first neighboring hypothetical line to form a first line grouping in the electronic document; and
   perform a digital ink stroke analysis on the electronic document based on the first line grouping.

2. The system of claim 1, wherein the electronic processor is configured to determine the first hypothetical line pairing using Delaunay triangulation.

3. The system of claim 1, wherein the electronic processor is configured to determine the set of merge confidence scores by extracting at least one feature associated with each hypothetical line pairing.

4. The system of claim 3, wherein the at least one feature includes at least one selected from a group consisting of an intersect feature, a contain feature, an angle difference feature, a left indent feature, a right indent feature, a horizontal overlap feature, a vertical overlap or gap feature, a width ratio feature, a wider aspect ratio feature, and a narrower aspect ratio feature.

5. The system of claim 1, wherein, in response to the first merge confidence score satisfying the merge threshold, the electronic processor is further configured determine an updated set of hypothetical line pairings and determine an updated set of merge confidence scores associated with the updated set of hypothetical line pairings.

6. The system of claim 5, wherein the electronic processor is further configured to:
  compare a second merge confidence score included in the updated set of merge confidence scores with the merge threshold, wherein the second merge confidence score is a highest merge confidence score included in the updated set of merge confidence scores and is associated with a second hypothetical line pairing including a second hypothetical line and a second neighboring hypothetical line; and
  in response to the second merge confidence score satisfying the merge threshold, merge the second hypothetical line and the second neighboring hypothetical line to form a second line grouping in the electronic document.

7. The system of claim 6, wherein the electronic processor is configured to perform the digital ink stroke analysis on the electronic document based on the first line grouping and the second line grouping.

8. The system of claim 6, wherein the electronic processor is configured to determine the set of hypothetical line pairings using an inclusion region, wherein the inclusion region is associated with the first hypothetical line and at least a portion of the first neighboring hypothetical line is positioned within the inclusion region.

9. The system of claim 1, wherein the digital ink stroke analysis includes at least one selected from a group consisting of a handwriting recognition analysis and a layout analysis.

10. A method of determining spatial line grouping on digital ink stokes, the method comprising:
   accessing a set of hypothetical lines in an electronic document including digital ink strokes, wherein each hypothetical line includes a set of digital ink strokes;
   determining, with an electronic processor, a set of hypothetical line pairings, wherein each hypothetical line pairing includes a hypothetical line and a neighboring hypothetical line;
   determining, with the electronic processor, via a gradient boosting tree model, a merge confidence score for each hypothetical line pairing included in the set of hypothetical line pairings as a set of merge confidence scores;
   comparing, with the electronic processor, a first merge confidence score included in the set of merge confidence scores with a merge threshold, wherein the first merge confidence score is a highest merge confidence score included in the set of merge confidence scores and is associated with a first hypothetical line pairing including a first hypothetical line and a first neighboring hypothetical line;
   in response to the first merge confidence score satisfying the merge threshold, merging, with the electronic processor, the first hypothetical line and the first neighboring hypothetical line to form a first line grouping in the electronic document; and
   performing a digital ink stroke analysis on the electronic document based on the first line grouping.

11. The method of claim 10, wherein determining the set of hypothetical line pairings includes determining the set of hypothetical line pairings using Delaunay triangulation.

12. The method of claim 10, wherein determining the first merge confidence score includes extracting at least one feature associated with the first hypothetical line pairing.

13. The method of claim 12, further comprising:
   in response to the first merge confidence score satisfying the merge threshold,
      determining an updated set of hypothetical line pairings, and
      determining an updated set of merge confidence scores associated with the updated set of hypothetical line pairings.

14. The method of claim 13, further comprising:
   comparing a second merge confidence score included in the updated set of merge confidence scores with the merge threshold, wherein the second merge confidence score is a highest merge confidence score included in the updated set of merge confidence scores and is associated with a second hypothetical line pairing including a second hypothetical line and a second neighboring hypothetical line; and
   in response to the second merge confidence score satisfying the merge threshold, merge the second hypothetical line and the second neighboring hypothetical line to form a second line grouping in the electronic document,
   wherein the digital ink stroke analysis is performed based on the first line grouping and the second line grouping.

15. A non-transitory computer readable medium storing instructions that, when executed by an electronic processor, perform a set of functions, the set of functions comprising:
   accessing a set of hypothetical lines in an electronic document including digital ink strokes, wherein each hypothetical line includes a set of digital ink strokes;
   determining a set of hypothetical line pairings, wherein each hypothetical line pairing includes a hypothetical line and a neighboring hypothetical line;
   determining, via a gradient boosting tree model, a merge confidence score for each hypothetical line pairing included in the set of hypothetical line pairings as a set of merge confidence scores;
   comparing a first merge confidence score included in the set of merge confidence scores with a merge threshold, wherein the first merge confidence score is a highest merge confidence score included in the set of merge confidence scores and is associated with a first hypothetical line pairing including a first hypothetical line and a first neighboring hypothetical line;
   in response to the first merge confidence score satisfying the merge threshold, merging the first hypothetical line and the first neighboring hypothetical line to form a first line grouping in the electronic document; and
   performing a digital ink stroke analysis on the electronic document based on the first line grouping.

16. The computer readable medium of claim 15, wherein the set of functions further comprise:
   in response to the first merge confidence score satisfying the merge threshold,
      determining an updated set of hypothetical line pairings, and
      determining an updated set of merge confidence scores associated with the updated set of hypothetical line pairings.

17. The computer readable medium of claim 16, further comprising:
   comparing a second merge confidence score included in the updated set of merge confidence scores with the merge threshold, wherein the second merge confidence score is a highest merge confidence score included in the updated set of merge confidence scores and is associated with a second hypothetical line pairing including a second hypothetical line and a second neighboring hypothetical line; and
   in response to the second merge confidence score satisfying the merge threshold, merge the second hypothetical line and the second neighboring hypothetical line to form a second line grouping in the electronic document,
   wherein the digital ink stroke analysis is performed based on the first line grouping and the second line grouping.

18. The computer readable medium of claim 15, wherein performing the digital ink stroke analysis includes at least one selected from a group consisting of a writing region grouping analysis, a bullet detection analysis, and an outline analysis.

19. The computer readable medium of claim 15, wherein determining the first merge confidence score includes extracting at least one feature associated with the first hypothetical line pairing.

20. The computer readable medium of claim 15, wherein determining the set of hypothetical line pairings includes determining the set of hypothetical line pairings using Delaunay triangulation.

* * * * *